United States Patent
Kushida et al.

(10) Patent No.: US 7,443,602 B2
(45) Date of Patent: Oct. 28, 2008

(54) ZOOM LENS AND IMAGING APPARATUS USING ZOOM LENS

(75) Inventors: Taro Kushida, Nagano (JP); Shinji Miyahara, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/564,311

(22) Filed: Nov. 29, 2006

(65) Prior Publication Data
US 2007/0242365 A1 Oct. 18, 2007

(30) Foreign Application Priority Data
Apr. 18, 2006 (JP) .............................. 2006-115055

(51) Int. Cl.
G02B 15/14 (2006.01)
G02B 27/64 (2006.01)
(52) U.S. Cl. ....................................... 359/683; 359/557
(58) Field of Classification Search ................. 359/676, 359/683, 554, 557
See application file for complete search history.

(56) References Cited

U.S. PATENT DOCUMENTS 6,307,342 B1   10/2001   Idemura
6,788,464 B2    9/2004   Misaka
7,023,624 B2 *  4/2006   Nanba ......................... 359/687
7,336,426 B2 *  2/2008   Nakatani et al. ............. 359/683

FOREIGN PATENT DOCUMENTS

| JP | HEI 10-90601 | 4/1998 |
| JP | HEI 11-344660 | 12/1999 |
| JP | 2001-356270 | 12/2001 |
| JP | 2002-107625 | 4/2002 |
| JP | 2004-252196 | 9/2004 |

* cited by examiner

Primary Examiner—Scott J Sugarman
(74) Attorney, Agent, or Firm—Thomas J. Strouse

(57) ABSTRACT

To provide a zoom lens which attains high zoom ratio and high optical performance over the entire zoom range, enables vibration control and miniaturization, and is compatible with a solid-state imaging device with a large size and a large number of pixels, the zoom lens 10 includes a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, which are sequentially arranged in that order from the object side. Zooming is performed by the independent movement of the first lens group G1, the second lens group G2, the third lens group G3, and the fourth lens group G4 along an optical axis. Image stabilization for mitigating camera shake is performed by the movement of the fourth lens group G4 along the direction perpendicular to the optical axis.

9 Claims, 18 Drawing Sheets

FIRST EXAMPLE: VARIOUS ABERRATIONS AT SHORT-FOCAL LENGTH

<D>
LATERAL ABERRATION WITHOUT VIBRATION CONTROL (SCALE = 0.05mm)

<E>
LATERAL ABERRATION WITH VIBRATION CONTROL
(CORRECTION OF 0.5-DEGREE CAMERA SHAKE) (SCALE = 0.05mm)

FIRST EXAMPLE: VARIOUS ABERRATIONS AT INTERMEDIATE-FOCAL LENGTH

<A> SPHERICAL ABERRATION (Fno=3.42)   <B> ASTIGMATISM (Y=3.6mm)   <C> DISTORTION (Y=3.6mm)

<D>
LATERAL ABERRATION WITHOUT VIBRATION CONTROL (SCALE = 0.05mm)

<E>
LATERAL ABERRATION WITH VIBRATION CONTROL
(CORRECTION OF 0.5-DEGREE CAMERA SHAKE) (SCALE = 0.05mm)

FIRST EXAMPLE: VARIOUS ABERRATIONS AT LONG-FOCAL LENGTH

<A> SPHERICAL ABERRATION (Fno=4.67)   <B> ASTIGMATISM (Y=3.6mm)   <C> DISTORTION (Y=3.6mm)

<D> LATERAL ABERRATION WITHOUT VIBRATION CONTROL (SCALE = 0.05mm)

<E> LATERAL ABERRATION WITH VIBRATION CONTROL (CORRECTION OF 0.5-DEGREE CAMERA SHAKE) (SCALE = 0.05mm)

SECOND EXAMPLE: VARIOUS ABERRATIONS AT SHORT-FOCAL LENGTH

<A> SPHERICAL ABERRATION (Fno=2.49)
<B> ASTIGMATISM (Y=3.6mm)
<C> DISTORTION (Y=3.6mm)

<D> LATERAL ABERRATION WITHOUT VIBRATION CONTROL (SCALE = 0.05mm)

<E> LATERAL ABERRATION WITH VIBRATION CONTROL
(CORRECTION OF 0.5-DEGREE CAMERA SHAKE) (SCALE = 0.05mm)

SECOND EXAMPLE: VARIOUS ABERRATIONS AT INTERMEDIATE-FOCAL LENGTH

<A> SPHERICAL ABERRATION (Fno=3.18)  <B> ASTIGMATISM (Y=3.6mm)  <C> DISTORTION (Y=3.6mm)

<D> LATERAL ABERRATION WITHOUT VIBRATION CONTROL (SCALE =0.05mm)

<E> LATERAL ABERRATION WITH VIBRATION CONTROL
(CORRECTION OF 0.5-DEGREE CAMERA SHAKE) (SCALE = 0.05mm)

SECOND EXAMPLE: VARIOUS ABERRATIONS AT LONG-FOCAL LENGTH

<A> SPHERICAL ABERRATION (Fno=5.05)  <B> ASTIGMATISM (Y=3.6mm)  <C> DISTORTION (Y=3.6mm)

<D> LATERAL ABERRATION WITHOUT VIBRATION CONTROL (SCALE =0.05mm)

<E> LATERAL ABERRATION WITH VIBRATION CONTROL (CORRECTION OF 0.5-DEGREE CAMERA SHAKE) (SCALE = 0.05mm)

THIRD EXAMPLE: VARIOUS ABERRATIONS AT SHORT-FOCAL LENGTH

<A> SPHERICAL ABERRATION (Fno=2.88)  <B> ASTIGMATISM (Y=3.6mm)  <C> DISTORTION (Y=3.6mm)

<D>
LATERAL ABERRATION WITHOUT VIBRATION CONTROL (SCALE =0.05mm)

<E>
LATERAL ABERRATION WITH VIBRATION CONTROL
(CORRECTION OF 0.5-DEGREE CAMERA SHAKE) (SCALE = 0.05mm)

THIRD EXAMPLE: VARIOUS ABERRATIONS AT INTERMEDIATE-FOCAL LENGTH

<A> SPHERICAL ABERRATION (Fno=3.50)    <B> ASTIGMATISM (Y=3.6mm)    <C> DISTORTION (Y=3.6mm)

<D>
LATERAL ABERRATION WITHOUT VIBRATION CONTROL (SCALE = 0.05mm)

<E>
LATERAL ABERRATION WITH VIBRATION CONTROL
(CORRECTION OF 0.5-DEGREE CAMERA SHAKE) (SCALE = 0.05mm)

THIRD EXAMPLE: VARIOUS ABERRATIONS AT LONG-FOCAL LENGTH

<A> SPHERICAL ABERRATION (Fno=5.59)   <B> ASTIGMATISM (Y=3.6mm)   <C> DISTORTION (Y=3.6mm)

<D> LATERAL ABERRATION WITHOUT VIBRATION CONTROL (SCALE =0.05mm)

<E> LATERAL ABERRATION WITH VIBRATION CONTROL
(CORRECTION OF 0.5-DEGREE CAMERA SHAKE) (SCALE = 0.05mm)

FOURTH EXAMPLE: VARIOUS ABERRATIONS AT SHORT-FOCAL LENGTH

<A> SPHERICAL ABERRATION (Fno=2.72)
<B> ASTIGMATISM (Y=3.6mm)
<C> DISTORTION (Y=3.6mm)

<D>
LATERAL ABERRATION WITHOUT VIBRATION CONTROL (SCALE =0.05mm)

<E>
LATERAL ABERRATION WITH VIBRATION CONTROL
(CORRECTION OF 0.5-DEGREE CAMERA SHAKE) (SCALE = 0.05mm)

FOURTH EXAMPLE: VARIOUS ABERRATIONS AT INTERMEDIATE-FOCAL LENGTH

<A> SPHERICAL ABERRATION (Fno=3.63)  <B> ASTIGMATISM (Y=3.6mm)  <C> DISTORTION (Y=3.6mm)

<D> LATERAL ABERRATION WITHOUT VIBRATION CONTROL (SCALE =0.05mm)

<E> LATERAL ABERRATION WITH VIBRATION CONTROL (CORRECTION OF 0.5-DEGREE CAMERA SHAKE) (SCALE = 0.05mm)

FOURTH EXAMPLE: VARIOUS ABERRATIONS AT LONG-FOCAL LENGTH

<A> SPHERICAL ABERRATION (Fno=5.84)   <B> ASTIGMATISM (Y=3.6mm)   <C> DISTORTION (Y=3.6mm)

<D>
LATERAL ABERRATION WITHOUT VIBRATION CONTROL (SCALE 0.05mm)

<E>
LATERAL ABERRATION WITH VIBRATION CONTROL
(CORRECTION OF 0.5-DEGREE CAMERA SHAKE) (SCALE = 0.05mm)

ZOOM LENS AND IMAGING APPARATUS USING ZOOM LENS

CROSS REFERENCE TO RELATED APPLICATIONS

This application claims priority to Japanese Patent Application No. 2006-115055 filed on Apr. 18, 2006, which is incorporated herein by reference in its entirety.

FIELD OF THE INVENTION

The present invention relates to a zoom lens with a vibration-proof mechanism.

BACKGROUND OF THE INVENTION

As the performance and features of imaging apparatuses such as digital still cameras, digital video cameras, and the like have grown more sophisticated in recent years, there has been a growing demand for apparatuses equipped with zoom lenses with high resolution and high zoom ratio. Meanwhile, there has also been a great demand for downsizing imaging apparatuses such as digital still cameras, and, as a result, a corresponding demand for downsizing the imaging optical systems used in such cameras.

However, use of a zoom lens with a high zoom ratio is problematic in that it is likely to lead to degradation in image quality due to a camera shake, particularly when images are captured using higher power telephoto zoom. As one technique for moderating such degradation in image quality, a zoom lens is equipped with a stabilized mechanism which moves some lens groups constituting the zoom lens substantially perpendicularly to the optical axis thereof, so that an image on the image plane moves in the direction opposite to the direction to that which the image moves when the image on the image plane is moved as a result of vibration, such as that caused external factors such as camera shake.

Such a stabilizing mechanism comprises a movement and other moving components to move the lens groups perpendicularly to the optical axis, so that mounting the stabilized mechanism on the zoom lens may increase the size of the zoom lens.

Japanese Patent Laid-Open Publication No. 2004-252196 discloses a technique in which, in a so-called five-group zoom lens composed of five lens groups having positive, negative, positive, positive and positive refractive powers, which are sequentially arranged in that order from the object side, all the lens groups are independently moved along the optical axis to perform a zoom operation, and some lens groups constituting the third lens group is moved perpendicularly to the optical axis to prevent vibration.

In the art described in Japanese Patent Laid-Open Publication No. 2004-252196, the vibration-proof mechanism is provided on the third lens group moving along the optical axis integrally with an aperture diaphragm and a shutter adjusting the amount of light, and some lens groups composing the third lens group are moved perpendicularly to the optical axis to prevent vibration.

However, when the stabilizing mechanism is integrated with the third lens group along with the aperture diaphragm and the shutter, the components of each of the driving mechanisms must be arranged in close proximity to each other, which limits the space available for arranging these components. Avoiding interference between the components otherwise requires increasing the overall size of the lens unit.

Japanese Patent Laid-Open Publications Nos. 2002-107625, 2001-356270, Hei 11-344660, and Hei 10-9060 disclose aspects of a technique in which, in a five-group zoom lens composed of five lens-groups with positive, negative, positive, negative and positive refractive powers, which are sequentially arranged in that order from the object side, a part or all the lens groups are moved along the optical axis to perform zooming, and the third lens group or the fourth lens group, or some lens groups constituting the third lens group or the fourth lens group are moved perpendicularly to the optical axis to prevent vibration.

However, the zoom lens disclosed in Japanese Patent Laid-Open Publication No. 2002-107625 has a zoom ratio of about 3.5×. Neither this document, nor any of the others, discloses any technique for realizing a high zoom ratio of 10× or more.

In fact, the zoom lenses disclosed in Japanese Patent Laid-Open Publication No. 2001-356270, Japanese Patent Laid-Open Publication No. Hei 11-344660 and Japanese Patent Laid-Open Publication No. Hei 10-90601 are designed for low resolution application suitable for use with a video camera equipped with a solid-state imaging device of relatively small size, on the order of ⅓-inch to ⅙-inch, and with a smaller number of pixels, 0.35 million to 2 million pixels.

When the zoom lenses disclosed in the patent documents 3 to 5 are used in a digital camera equipped with a solid-state imaging device of relatively larger size, about $\frac{1}{1.8}$-inch to $\frac{1}{2.5}$-inch, and larger number of pixels, 4 million to 10 million, the total size of an imaging optical system must be increased according to the size of the solid-state imaging device to significantly increase the size of the system, which makes configuring a higher resolution system with this technology extremely problematic.

SUMMARY OF THE INVENTION

The present invention advantageously provides a zoom lens which attains high zoom ratio and high optical performance over the entire zoom range, enables vibration control and miniaturization, and is compatible with a solid-state imaging device with a large size and a large number of pixels.

A zoom lens according to the present invention includes, as arranged sequentially in the following order from an object side: a first lens group having a positive refractive power; a second lens group having a negative refractive power; a third lens group having a positive refractive power; a fourth lens group having a positive refractive power; and a fifth lens group having a positive refractive power, wherein at least four lens groups including the first lens group, the second lens group, the third lens group, and the fourth lens group independently move along an optical axis to implement zooming, and at least part of a lens group of the fourth lens group moves along a direction perpendicular to the optical axis to displace an image.

According to one aspect of the zoom lens according to the present invention, the zoom lens has a zooming range in which a space between the third lens group and the fourth lens group is gradually reduced from a wide angle end to a telephoto end.

According to another aspect of the zoom lens according to the present invention, if a surface space between the third lens group and the fourth lens group on the optical axis at the wide angle end and the telephoto end is taken to be T34$w$ and T34$t$ respectively, the zoom lens satisfies the following condition:

$$2.0 < T34w/T34t < 7.0$$

According to another aspect of the zoom lens according to the present invention, if the composite focal length of the third lens group and the fourth lens group at the wide angle end and the telephoto end is taken to be f34w and f34t respectively, the focal length of the third lens group is taken to be f3, the focal length of the fourth lens group is taken to be f4, and the focal length of the entire system of the zoom lens at the wide angle end and the telephoto end is taken to be fw and ft respectively, the zoom lens satisfies the following conditions:

$$2.7 < f34w/fw < 4.0$$

$$0.15 < f34/ft < 0.36$$

$$3.3 < f3/fw < 5.5$$

$$0.2 < f4/ft < 0.6$$

According to a further aspect of the zoom lens according to the present invention, if the focal length of the first lens group is taken to be f1, the focal length of the second lens group is taken to be f2, and the focal length of the entire system at the wide angle end and the telephoto end is taken to be fw and ft respectively, the zoom lens satisfies the following conditions:

$$6.7 < f1/fw < 14.0$$

$$0.08 < |f2/ft| < 0.16$$

According to a still further aspect of the zoom lens according to the present invention, if the lens face of the fourth lens group positioned nearest to the image plane has a convex shape facing the image plane, radius of curvature of the lens face is taken to be Ra, and the focal length of the entire system is taken to be fw at the wide angle end, the zoom lens satisfies the following condition:

$$|Ra/fw| > 5.5$$

According to another aspect of the zoom lens according to the present invention, the fourth lens group is constituted by a cemented lens in which a negative meniscus lens with its convex surface facing the object side and a biconvex lens having a positive refractive power are sequentially arranged in this order from the object side and joined together.

According to another aspect of the zoom lens according to the present invention, if the fifth lens group is moved to focus, the focal length of the fifth lens group is taken to be f5 and the focal length of the entire system at the telephoto end is taken to be ft, the zoom lens satisfies the following condition:

$$0.24 < f5/ft < 0.80$$

According to a further aspect of the zoom lens according to the present invention, each of the second lens group and the third lens group comprises at least one aspherical lens.

According to a still further aspect of the present invention, the fourth lens group is provided with the same positive refractive power as the third lens group to share function therewith, which allows the zoom lens to be downsized and to attain a high performance and a high zoom ratio. In addition, at least some lens groups in the fourth lens group are moved perpendicularly to the optical axis, thereby enabling the vibration-proof mechanism to be provided at a position away from a light amount controlling mechanism generally disposed in the vicinity of the third lens group. This permits further downsizing and makes it possible to provide a zoom lens compatible with a larger solid-state imaging device having a large number of pixels.

BRIEF DESCRIPTION OF THE DRAWINGS

Preferred embodiments of the present invention will be described in detail based on the following figures, wherein.

DESCRIPTION OF PREFERRED EMBODIMENTS

The best mode for carrying out the invention is described below with reference to the drawings.

Figure 1:
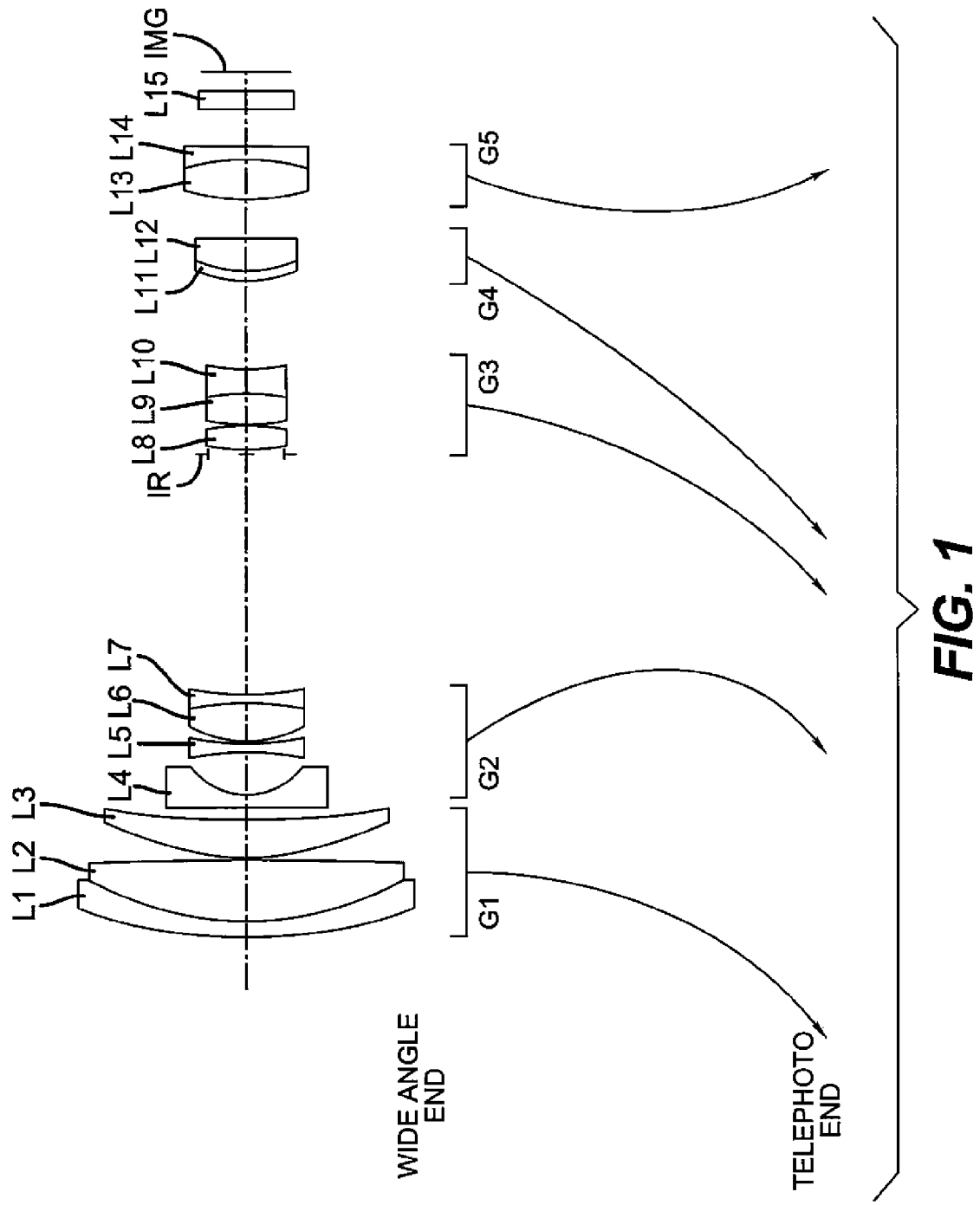
FIG. 1 shows a cross section along an optical axis of a zoom lens according to a preferred embodiment of the present invention.

FIG. 1 shows a cross section along the optical axis of a zoom lens according to a preferred embodiment of the present invention. As shown in FIG. 1, the zoom lens 10 includes a first lens group G1 having a positive refractive power, a second lens group G2 having a negative refractive power, a third lens group G3 having a positive refractive power, a fourth lens group G4 having a positive refractive power and a fifth lens group G5 having a positive refractive power, which are sequentially arranged in this order from the object side. In the preferred embodiment, zooming is performed by independent movement of the first lens group G1, the second lens group G2, the third lens group G3 and the fourth lens group G4 along an optical axis. Image stabilization (vibration control) for correcting camera shake is performed by movement of the fourth lens group G4 perpendicular to the optical axis.

In the preferred embodiment, the first lens group G1 focuses light rays with a positive refractive power. The second lens group G2, with a negative refractive power, then enlarges the object image formed by the first lens group G1. The third lens group G3 and the fourth lens group G4 share a function for converging light rays enlarged by the second lens group G2, and both therefore have a positive refractive power. When zooming from a wide angle view to a telephoto view, that is, when varying the focal length from the wide angle end to the telephoto end, as shown in FIG. 1, each lens group is moved along the optical axis as shown by the arrows, in the direction to which space between the first lens group G1 and the second lens group G2 is increased and in the direction to which space between the second lens group G2 and the third lens group G3 is reduced. Thus, each lens group is independently moved such that each lens group contributes to the adjustment of zoom ratio, enabling the zoom lens to attain miniaturization and high zoom ratio.

The third lens group G3 and the fourth lens group G4 converge light beams by their positive refractive power and share an imaging function. A light amount controlling mechanism IR including a diaphragm function for adjusting the amount of light and a shutter function for opening or closing an optical path is provided on the object side of the third lens group G3. An image stabilizing (vibration dampening) mechanism (not shown) in which the fourth lens group G4 is moved substantially perpendicularly to the optical axis to move the image in a direction opposite to a direction to which the image is moved by external factors such as camera shake is provided in the vicinity of the fourth lens group G4.

In the preferred embodiment, the light amount controlling mechanism IR is provided near the third lens group G3 and the vibration-proof mechanism is provided near the fourth lens group G4. That is to say, the light amount controlling mechanism IR and the vibration-proof mechanism are provided in the vicinity of the lens groups different from each other. As a result, restrictions on space for arranging the light amount controlling mechanism IR and the vibration-proof mechanism are loosened, and a more compact zoom lens can be realized.

In the preferred embodiment, the space between the third lens group G3 and the fourth lens group G4 is varied when zooming from the wide angle end to the telephoto end, to simultaneously correct aberration caused by the vibration control of the fourth lens group G4, curvature of image plane, coma aberration caused by a high zoom ratio, and image plane movement caused at the time of zoom operation, at each zoom ratio range.

Furthermore, each lens group is moved to reduce the space between the third lens group G3 and the fourth lens group G4 at the time of zooming from the wide angle end to the telephoto end to refract off-axis light beams at the periphery of the fourth lens group G4 performing a vibration control. At the telephoto end, off-axis light beams are refracted near the optical axis to satisfactorily correct a curvature of image plane in the focal length range at the wide angle side. Each lens group is further moved so as to reduce the space between the third lens group G3 and the fourth lens group G4, allowing suppressing the occurrence of coma aberration caused by the fourth lens group G4's decentering at the time of the vibration control in the focal length range at the telephoto side.

Furthermore, the fifth lens group G5 has functions to move the position of an exit pupil to the object side so that a solid-state imaging device such as a CCD having directivity in an optical sensitivity properly outputs video signals and to supplementally correct image plane movement caused by zooming. The fifth lens group G5 may be structured to be fixed at the time of zooming.

Still furthermore, it is preferable that the zoom lens 10 satisfies the following conditions in order to maintain high zoom ratio and high optical performance over the entire zoom range.

First, if surface distances on the optical axis between the third lens group G3 and the fourth lens group G4 at the wide angle end and the telephoto end are taken as T34w and T34t respectively, the zoom lens 10 preferably satisfies the following Conditional Expression (1):

$$2.0 < T34w/T34t < 7.0 \tag{1}$$

This Conditional Expression (1) defines the ratio of the surface distance on the optical axis between the third lens group G3 and the fourth lens group G4 at the wide angle end and the telephoto end. If T34w/T34t is not less than 7.0, which is the upper limit of the Conditional Expression (1), the lens diameter of the fourth lens group G4 performing a vibration control must be increased because light passing through the fourth lens group G4 is excessively dispersed beyond the optical axis toward the outer periphery at the wide angle end. On the other hand, when T34w/T34t is not less than 7.0, which is the upper limit of the Conditional Expression (1), the variation of the surface distance between the third lens group G3 and the fourth lens group G4 is comparatively larger. For this reason, if T34w/T34t is not less than 7.0 Conditional Expression (1), it is necessary to provide movement space between the third lens group G3 and the fourth lens group G4, resulting in increasing the size of the entire system of the zoom lens. In addition, if T34w/T34t is not greater than 2.0, which is the lower limit of the Conditional Expression (1), the variation of the surface distance between the third lens group G3 and the fourth lens group G4 is significantly smaller. In this case, it is often not possible to correct both off-axis aberrations such as astigmatism and field curvature caused by the fourth lens group G4 at the wide angle end, and coma aberration caused by the fourth lens group G4's decentering on the axis at the time of vibration control at the telephoto end. As described above, according to the preferred embodiment, if the ratio of the surface distance on the optical axis between the third lens group G3 and the fourth lens group G4 satisfies the Conditional Expression (1), a field curvature occurred at the wide angle end and a coma aberration caused at the time of vibration control of the fourth lens group G4 at the telephoto side can be satisfactorily corrected, thereby realizing a compact five-group zoom lens capable of high zoom ratio.

In addition, if the composite focal length of the third lens group G3 and the fourth lens group G4 at the wide angle end and the telephoto end is taken as f34w and f34t respectively, the focal length of the third lens group G3 and the fourth lens group G4 is taken as f3 and f4 respectively, and the focal length of the entire system of the zoom lens 10 at the wide angle end and the telephoto end is taken as fw and ft respectively, the zoom lens 10 preferably satisfies the following Conditional Expressions (2), (3), (4) and (5):

$$2.7 < f34w/fw < 4.0 \tag{2}$$

$$0.15 < f34t/ft < 0.36 \tag{3}$$

$$3.3 < f3/fw < 5.5 \tag{4}$$

$$0.2 < f4/ft < 0.6 \tag{5}$$

Conditional Expression (2) defines the composite focal length of the third lens group G3 and the fourth lens group G4 at the wide angle end. If f34w/fw is not less than 4.0, which is the upper limit of the Conditional Expression (2), the refractive power of the third lens group G3 and the fourth lens group G4 with respect to the overall system becomes excessively weak at the wide angle end, hampering or limiting attempts to increase the zoom ratio. If, on the other hand, f34w/fw is not greater than 2.7, which is the lower limit of the Conditional Expression (2), the refractive power of the third lens group G3 and the fourth lens group G4 at the wide angle end becomes excessively strong, hampering attempts to secure space for arranging the fifth lens group G5 nearer to the image plane than the fourth lens group G4 and arranging optical equivalent members such as an optical low pass filter and the like.

The Conditional Expression (3) defines the composite focal length of the third lens group G3 and the fourth lens group G4 at the telephoto end. If f34t/ft is not less than 0.36, which is the upper limit of the Conditional Expression (3), the refractive power of the third lens group G3 and the fourth lens group G4 with respect to the entire system at the telephoto end becomes excessively weak, making it necessary to lengthen the overall system of the zoom lens in the direction of the optical axis. If f34t/ft is not greater than 0.15, which is the lower limit of the Conditional Expression (3), the refractive power of the third lens group G3 and the fourth lens group G4 with respect to the entire system at the telephoto end becomes excessively strong, which increases coma aberration caused by the fourth lens group G4's decentering at the time of vibration control, which in turn makes correction difficult.

The Conditional Expression (4) defines an appropriate range for the focal length of the third lens group G3 at the wide angle end. If f3/fw is not less than 5.5, which is the upper limit of the Conditional Expression (4), the refractive power of the third lens group G3 with respect to the overall system becomes excessively weak, which makes it difficult to increase the zoom ratio, as well as making it necessary to enlarge the lens diameter of the fourth lens group G4 arranged nearer to the image plane than the third lens group G3, which may in turn increasing both the size and power consumption of the image stabilizing mechanism provided on the fourth lens group G4. Furthermore, if f3/fw is not greater than 3.3, which is the lower limit of the Conditional Expression (4), the refractive power of the third lens group G3 with respect to the entire system becomes excessively strong, which makes it difficult to satisfactorily correct a spherical aberration or an axial chromatic aberration.

The Conditional Expression (5) defines an appropriate range for the focal length of the fourth lens group G4 at the telephoto end. If f4/fw is not less than 0.6, which is the upper limit of the Conditional Expression (5), the refractive power of the fourth lens group G4 with respect to the overall system is weak, such that the effect of the fourth lens group G4 is insufficient, such that elongation of the overall system of the zoom lens in the direction of the optical axis is required. If, on the other hand, f4/ft is not greater than 0.2, which is the lower limit of the Conditional Expression (5), the refractive power of the fourth lens group G4 with respect to the entire system becomes excessively strong, which makes it difficult to satisfactorily correct astigmatism and lateral chromatic aberration caused at the time of vibration control of the fourth lens group G4 in a focal length region at the telephoto side.

As stated above, ensuring that the Conditional Expressions (2) to (5) are satisfied makes it possible to realize a compact five-group zoom lens of high zoom ratio capable of satisfactorily correcting various aberrations at each zoom range and reducing variation in aberration at the time of vibration control.

In addition, when the focal length of the first lens group G1 and the second lens group G2 are f1 and f2, respectively, and the focal length of the entire system of the zoom lens at the wide angle end and at the telephoto end is taken as fw and ft respectively, the zoom lens 10 preferably satisfies the following Conditional Expressions (6) and (7):

$$6.7 < f1/fw < 14.0 \tag{6}$$

$$0.08 < |f2/ft| < 0.16 \tag{7}$$

Conditional Expression (6) defines an appropriate range for the focal length of the first lens group G1 at the wide angle end. If f1/fw is not less than 14.0, which is the upper limit of the Conditional Expression (6), the refractive power of the first lens group G1 with respect to the entire system becomes excessively weak, which hampers efforts to increase the zoom ratio. If, on the other hand, f1/fw is not greater than 6.7, which is the lower limit of the Conditional Expression (6), the refractive power of the first lens group G1 with respect to the entire system becomes excessively strong, which makes it difficult to satisfactorily correct a spherical aberration or an axial chromatic aberration at the wide angle end.

The Conditional Expression (7) defines an appropriate range for the focal length of the second lens group G2 at the telephoto end. If f2/ft is less than 0.16, which is the upper limit of the Conditional Expression (7), the refractive power of the second lens group G2 with respect to the overall system becomes excessively weak, which hampers attempts to increase the zoom ratio of the zoom lens. If, on the other hand, f2/fw is not greater than 0.08, which is the lower limit of the Conditional Expression (7), the refractive power of the second lens group G2 with respect to the entire system becomes excessively strong, which making it difficult to satisfactorily correct a spherical aberration or an axial chromatic aberration at the telephoto end.

Furthermore, in the preferred embodiment, the lens face of the fourth lens group G4 positioned nearest to the image plane has a convex shape facing the image plane. If the radius of curvature is taken as Ra, it is desirable to satisfy the following Conditional Expression (8):

$$|Ra/fw| > 5.5 \tag{8}$$

Conditional Expression (8) defines an appropriate shape of lens face of the fourth lens group G4, which performs vibration control, positioned nearest to the image plane. If |Ra/fw| is not greater than 5.5, which is the lower limit of the Conditional Expression (8), the angle of incidence of light upon the surface of the lens in the fourth lens group G4 positioned nearest to the image plane becomes large, which makes it difficult to satisfactorily correct aberration at the time of vibration control.

In addition, in the preferred embodiment, it is preferable that the fourth lens group G4 is constituted by a cemented lens in which a negative meniscus lens with its convex surface facing the object side and a positive lens with its convex surface facing back to back are sequentially arranged in this order from the object side and joined together. Constituting the fourth lens group G4 in this manner makes it possible to minimize the occurrence of a chromatic aberration at the time of vibration control and downsizing the vibration-proof mechanism provided near the fourth lens group G4.

In the preferred embodiment, the fifth lens group G5 is moved to focus an image. If the focal length of the fifth lens group G5 is taken as f5, it is preferable that the following Conditional Expression (9) be satisfied:

$$0.24 < f5/ft < 0.80 \tag{9}$$

Conditional Expression (9) defines an appropriate range for the focal length of the fifth lens group G5 in the overall system of the zoom lens at the telephoto end. If f5/ft is not less than 0.80, which is the upper limit of the Conditional Expression (9), the overall refractive power of the fifth lens group G5 is reduced, reducing the efficiency of that lens group and making it necessary to lengthen the overall system of the zoom lens along the direction of the optical axis. If, on the other hand, f5/ft is not more than 0.24, which is the lower limit of the Conditional Expression (9), the refractive power of the fifth lens group G5 with respect to the entire system becomes excessively strong, which makes it difficult to satisfactorily correct an astigmatism and a lateralchromatic aberration.

In addition, in the preferred embodiment, the use of an aspherical lens instead of at least some of the lenses constituting the second lens group G2 and the third lens group G3 makes it possible to effectively correct aberration and to realize the zoom lens 10 with a higher zoom ratio and a wider angle. Further, constituting some component of the second lens group G2 with an aspherical lens makes it possible to satisfactorily correct distortion aberration and astigmatism at the wide angle range. Still furthermore, constituting a part of the third lens group G3 with an aspherical lens makes it possible to satisfactorily correct spherical aberration, especially at the telephoto end.

Constituting the lens groups so as to simultaneously satisfy all of the above conditions makes it possible to provide zoom lens 10 which is compact, has a zoom ratio as high as 11× to 17×, and is suited for use in conjunction with a high-resolution solid-state imaging device having a relatively larger number of pixels. Because a zoom lens 10 which satisfies each of the conditions defined above can provide high performance imaging and suppresses change in aberration during vibration dampening, aberration can be satisfactorily corrected image stabilization. Thus, an imaging apparatus equipped with the zoom lens 10 can simultaneously attain reduction in size, high zoom ratio, and include an image stabilization function.

In the following, first, second, third, and fourth preferred embodiments of the present invention are described with reference to the drawings. FIGS. 2 to 5 relate to the first example of the present invention; FIGS. 6 to 9 relate to the second example; FIGS. 10 to 13 relate to the third example; and FIGS. 14 to 17 relate to the fourth example.

First, items common among the embodiments will be described.

In the following description, "Si" denotes the i-th surface numbered from an object side, "Ri" a radius of curvature on a surface Si, "Ti" a surface space on the optical axis between the i-th and the i+1-th surface from the object side, "ndLi" a refractive index of the lens Li for d-line (wavelength of 587.6 nm), "vdLi" the Abbe number of the lens Li for d-line, "f" the focal length of the entire lens system, "Fno" an open aperture f-number, and "ω" a value equal to one half the viewing angle.

Lenses used in the embodiments include lenses constituted by an aspheric surface lens.

If the distance from the apex of a lens toward the optical axis is "x", the distance from the apex of a lens to the direction perpendicular to the optical axis is "y", the paraxial radius of curvature is R, and an aspheric surface coefficient is k, A, B, C and D, the aspheric surface shape can be expressed by the following equation:

$$x = \frac{(1/R)y^2}{1+\sqrt{1-(1+k)(y/R)^2}} + Ay^4 + By^6 + Cy^8 + Dy^{10}$$ [Numerical Expression 1]

As shown in FIGS. 2, 6, 10 and 14, the zoom lenses in the first to fourth examples include a first lens group G1 having a positive refractive power, a second lens group G2 having a negative refractive power, a third lens group G3 having a positive refractive power, a fourth lens group G4 having a positive refractive power, and a fifth lens group G5 having a positive refractive power, sequentially arranged in that order from the object side to image plane IMG. FIGS. 2, 6, 10 and 14 show a positional relationship between the lens groups at the wide angle end.

The light amount controlling mechanism IR functioning as a diaphragm and a shutter is arranged between the second lens group G2 and the third lens group G3. In addition, an optical equivalent member L15 is arranged between the fifth lens group G5 and the image plane IMG. The optical equivalent member L15 may be constituted by a low pass filter, an infrared cut filter, and a cover glass for a solid-state imaging device, for example, with the components being sequentially arranged in that order from the object side.

FIRST EXAMPLE

Figure 2:
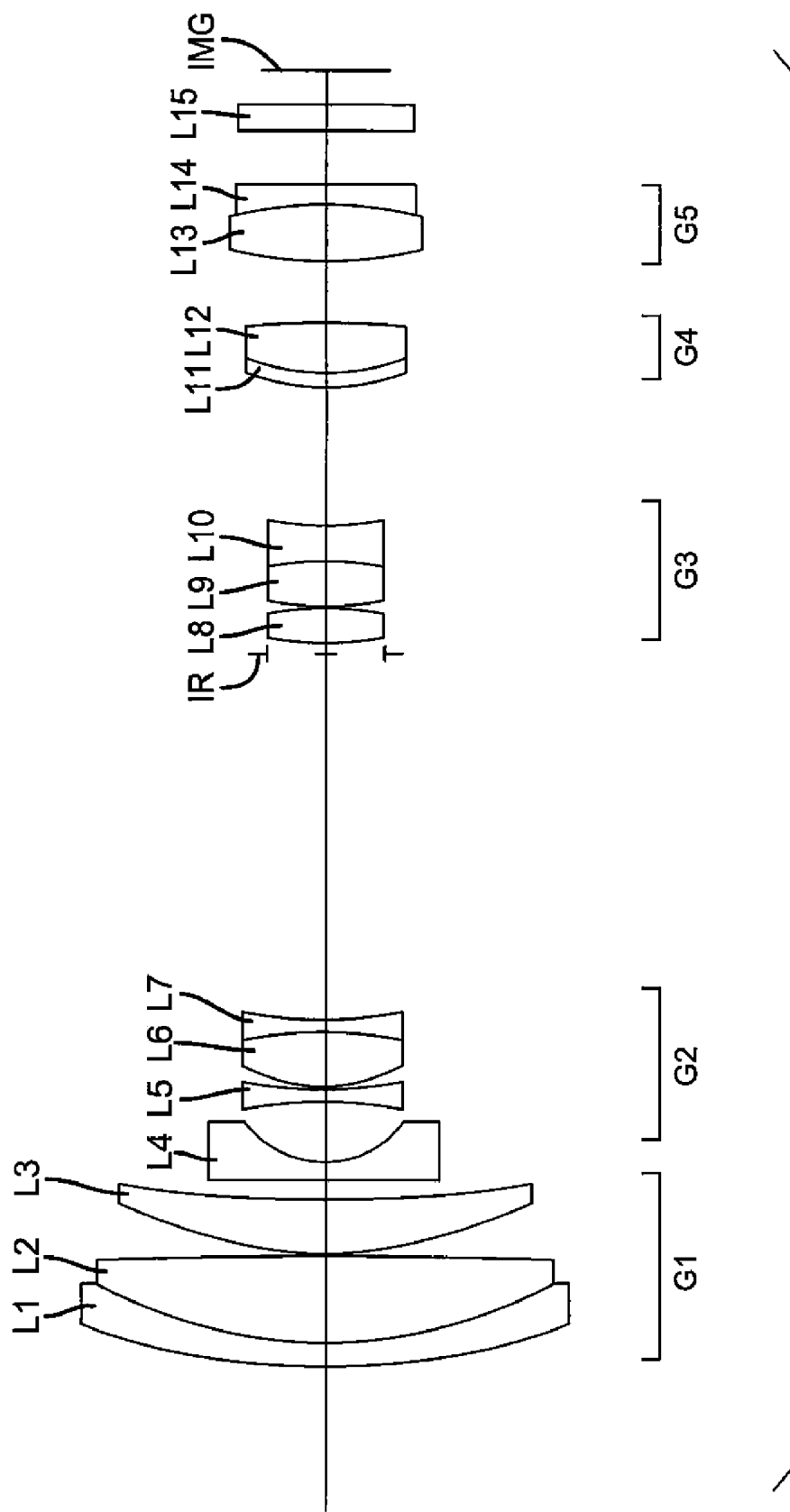
FIG. 2 shows a cross section along an optical axis of a zoom lens according to a first example of the present invention at a wide angle end.

FIG. 2 shows a cross section along the optical axis of the zoom lens 10 according to a first example of the present invention, at the wide angle end. As shown in FIG. 2, in the first example, the first lens group G1 is composed of a cemented lens in which a negative meniscus lens L1 and a biconvex lens L2 are joined together and then a positive meniscus lens L3 with its convex surface facing the object side is provided, with the lenses provided in that order from the object side. As a unit, the first lens group G1 has a positive refractive power.

The second lens group G2 is composed of a negative meniscus lens L4, a biconcave lens L5, and a cemented lens in which a biconvex lens L6 and a biconcave lens L7 are joined together, sequentially arranged in that order from the object side. As a unit, the second lens group G2 has a negative refractive power.

The third lens group G3 is composed of a biconvex lens L8 and a cemented lens in which a biconvex lens L9 and a biconcave lens L10 are joined together, sequentially arranged in that order from the object side. As a unit, the second lens group G3 has a positive refractive power. The light amount controlling mechanism IR is provided adjacent to the third lens group G3 on the object side.

The fourth lens group G4 is constituted by a cemented lens in which a negative meniscus lens L11 and a biconvex lens L12 are sequentially arranged, in that order from the object side, and joined together. As a unit, the fourth lens group G4 has a positive refractive power. The vibration-proof mechanism is provided in the vicinity of the fourth lens group G4 to move the fourth lens group G4 substantially perpendicularly to the optical axis thereof to compensate for vibration of images caused by camera shake.

The fifth lens group G5 is constituted by a cemented lens in which a biconvex lens L13 and a negative meniscus lens L14 are sequentially arranged, in that order from the object side, and joined together. As a whole, the fifth lens group G5 has a positive refractive power.

Table 1 shows the focal length, F number and half viewing angle of the zoom lens according to the first example for wide angle, intermediate, and telephoto. Length "f" is measured in mm, and angle "ω" in degrees.

TABLE 1

| FOCAL LENGTH | f | Fno | ω |
|---|---|---|---|
| SHORT | 6.03 | 2.88 | 32.03 |
| INTERMEDIATE | 20.26 | 3.42 | 10.08 |
| LONG | 68.11 | 4.67 | 2.99 |

Table 2 shows numerical data of a zoom lens according to the first example. Lengths R and T are measured in mm, and INF in the table indicates infinity.

TABLE 2

| | SURFACE | RADIUS OF CURVATURE R | | SURFACE SPACE T | | REFRACTIVE INDEX ndL | | ABBE NUMBER vdL | |
|---|---|---|---|---|---|---|---|---|---|
| L1 | S1 | R1 | 40.000 | T1 | 1.500 | ndL1 | 1.8467 | vdL1 | 23.8 |
| L2 | S2 | R2 | 27.860 | T2 | 5.500 | ndL2 | 1.4875 | vdL2 | 70.4 |
| | S3 | R3 | −218.300 | T3 | 0.200 | — | — | — | — |
| L3 | S4 | R4 | 25.890 | T4 | 3.200 | ndL3 | 1.4970 | vdL3 | 81.6 |
| | S5 | R5 | 70.900 | T5 | VARIABLE | — | — | — | — |
| L4 | S6 | R6 | 95.800 | T6 | 1.300 | ndL4 | 1.7550 | vdL4 | 52.3 |
| | S7 | R7 | 6.554 | T7 | 3.816 | — | — | — | — |
| L5 | S8 | R8 | −21.920 | T8 | 0.800 | ndL5 | 1.5891 | vdL5 | 61.3 |
| | S9 | R9 | 21.920 | T9 | 0.200 | — | — | — | — |
| L6 | S10 | R10 | 11.570 | T10 | 3.000 | ndL6 | 1.8467 | vdL6 | 23.8 |
| L7 | S11 | R11 | −46.290 | T11 | 0.800 | ndL7 | 1.8061 | vdL7 | 33.3 |
| | S12 | R12 | 21.800 | T12 | VARIABLE | — | — | — | — |
| IR | — | R13 | — | T13 | 0.500 | — | — | — | — |
| L8 | S13 | R14 | 21.900 | T14 | 2.000 | ndL8 | 1.4970 | vdL8 | 81.6 |
| | S14 | R15 | −21.900 | T15 | 0.100 | — | — | — | — |
| L9 | S15 | R16 | 8.960 | T16 | 3.300 | ndL9 | 1.6230 | vdL9 | 58.1 |
| L10 | S16 | R17 | −9.900 | T17 | 1.800 | ndL10 | 1.7015 | vdL10 | 41.1 |
| | S17 | R18 | 7.506 | T18 | VARIABLE | — | — | — | — |
| L11 | S18 | R19 | 13.950 | T19 | 0.800 | ndL11 | 1.8042 | vdL11 | 46.5 |
| L12 | S19 | R20 | 9.100 | T20 | 3.000 | ndL12 | 1.4875 | vdL12 | 70.4 |
| | S20 | R21 | −90.000 | T21 | VARIABLE | — | — | — | — |
| L13 | S21 | R22 | 18.460 | T22 | 3.500 | ndL13 | 1.8042 | vdL13 | 46.5 |
| L14 | S22 | R23 | −18.460 | T23 | 1.000 | ndL14 | 1.8052 | vdL14 | 25.5 |
| | S23 | R24 | −509.000 | T24 | VARIABLE | — | — | — | — |
| L15 | S24 | R25 | INF | T25 | 1.500 | ndL15 | 1.5168 | vdL15 | 64.2 |
| | S25 | R26 | INF | T26 | — | — | — | — | — |

Table 3 shows the values of surface intervals T5, T12, T18, T21 and T24 which can be varied by zooming at the wide angle, intermediate, and telephoto.

TABLE 3

| | FOCAL LENGTH | | |
|---|---|---|---|
| | 6.03 | 20.26 | 68.11 |
| S5 | 1.013 | 14.308 | 23.893 |
| S12 | 21.984 | 7.653 | 3.000 |
| S17 | 7.799 | 2.800 | 2.000 |
| S20 | 3.500 | 11.617 | 24.832 |
| S23 | 3.401 | 7.684 | 3.300 |

Table 4 shows parameters of Conditional Expressions (1) to (9) according to the first example.

TABLE 4

| (1) | T34w/T34t | 3.90 |
|---|---|---|
| (2) | f34w/fw | 3.02 |
| (3) | f34t/ft | 0.23 |
| (4) | f3/fw | 3.49 |
| (5) | f4/ft | 0.51 |
| (6) | f1/fw | 7.33 |
| (7) | |f2/ft| | 0.11 |
| (8) | |Ra/fw| | 14.93 |
| (9) | f5/ft | 0.33 |

Figure 3:
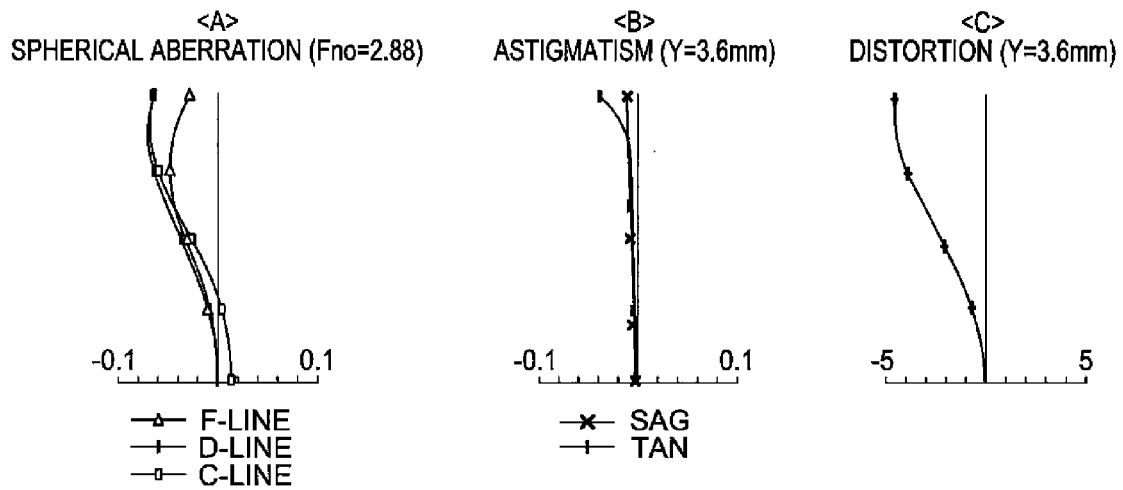
FIG. 3 shows various aberrations of the zoom lens according to the first example at a wide angle end.
Figure 3:
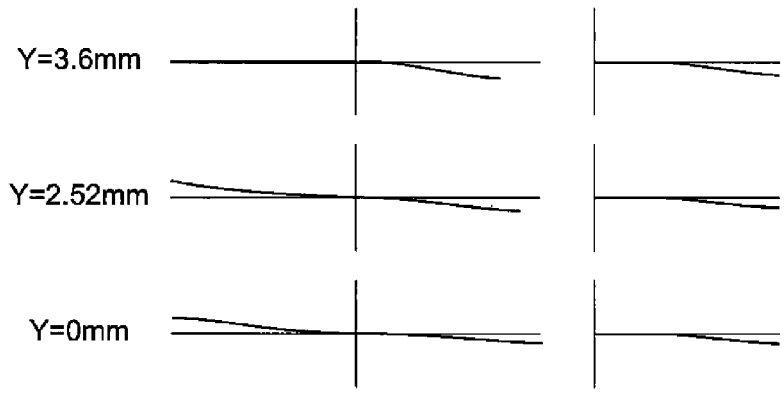
Figure 3:
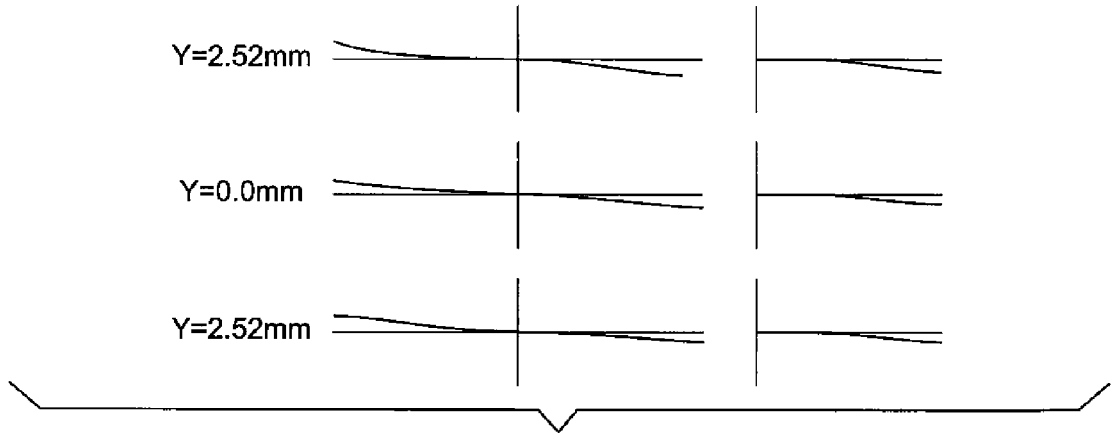
Figure 4:
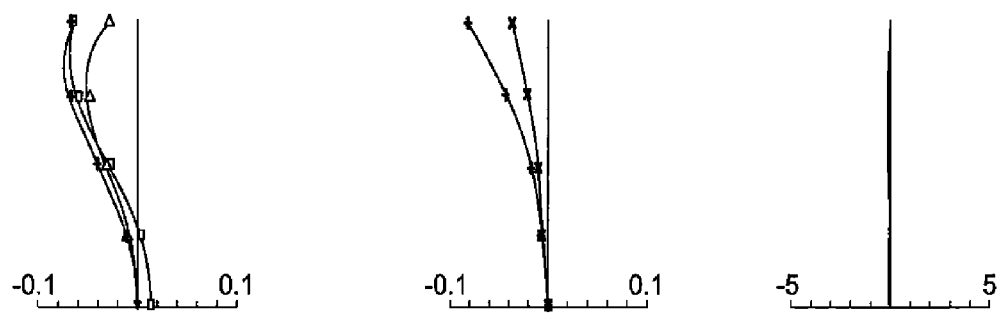
FIG. 4 shows various aberrations of the zoom lens according to the first example at an intermediate-focal length.
Figure 4:
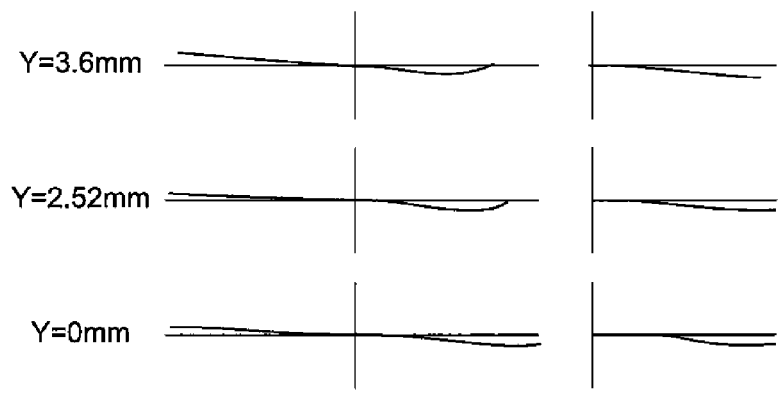
Figure 4:
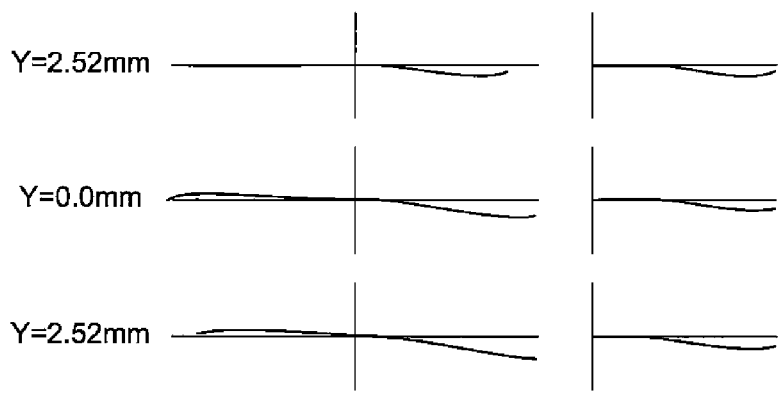
Figure 5:
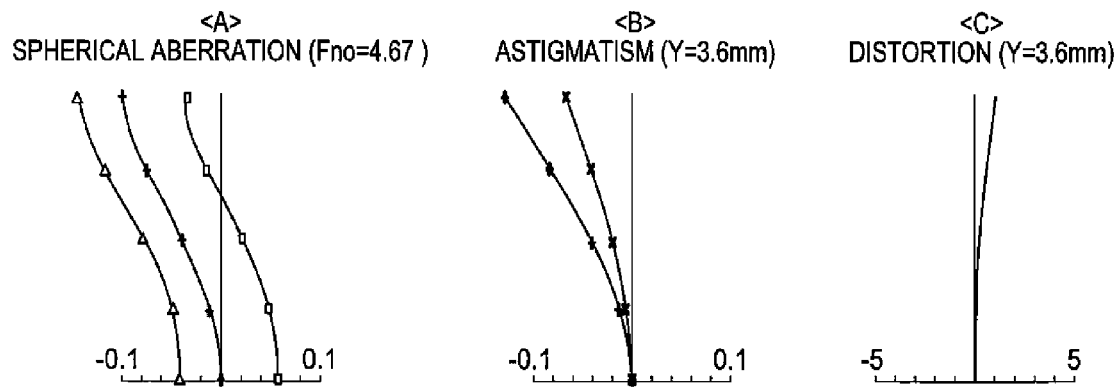
FIG. 5 shows various aberrations of a zoom lens according to the first example at a telephoto end.
Figure 5:
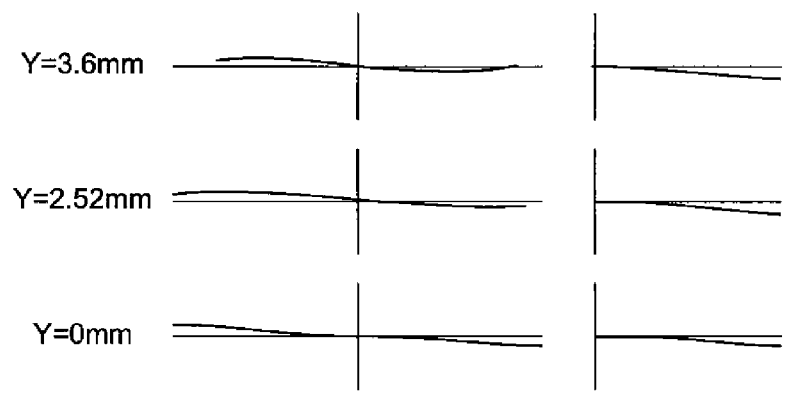
Figure 5:
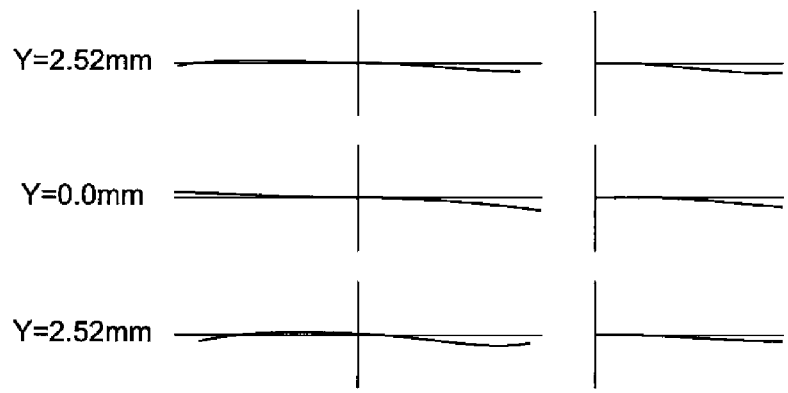

FIGS. 3 to 5 show various aberrations of the zoom lens 10 according to the first example at the wide angle, intermediate and telephoto ends. In FIGS. 3 to 5, A denotes a sphericalaberration, B an astigmatism, C a distortion, D a ray intercept curve without vibration control, and E a ray intercept curve with vibration control. In FIGS. 3 to 5, image height is Y. This applies to the second through forth examples.

As shown in FIGS. 3 to 5, a zoom lens 10 according to the first example is capable of realizing a high zoom ratio and of satisfactorily correcting various aberrations, even while performing image stabilization, at zoom ranges from wide angle end to telephoto.

SECOND EXAMPLE

Figure 6:
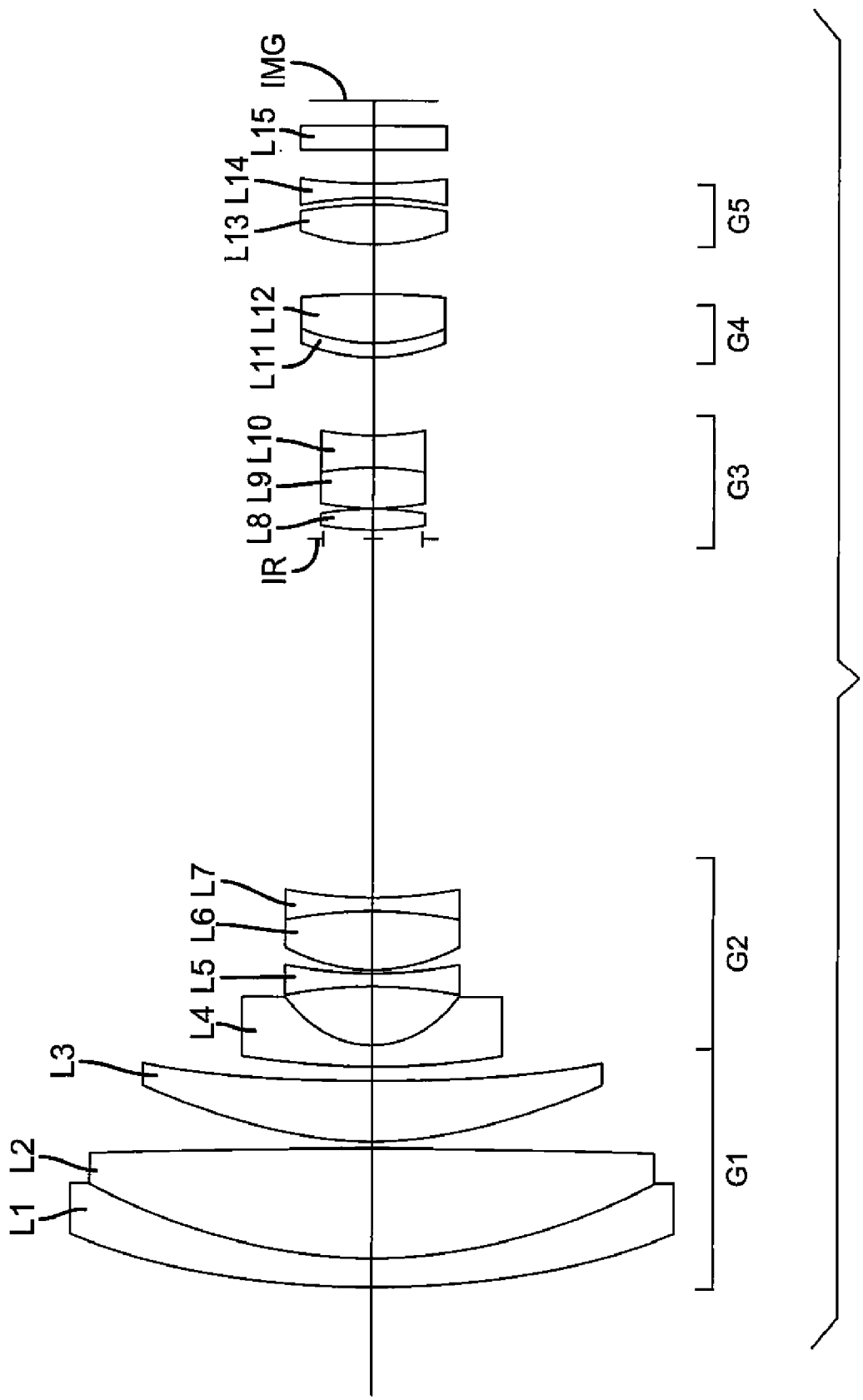
FIG. 6 shows a cross section along an optical axis of a zoom lens according to a second example of the present invention at a wide angle end.

Next, a second example of the present invention will be described. As shown in FIG. 6, the first lens group G1 in the second example has the same structure as that of the first example. The second lens group G2 is composed of a negative meniscus lens L4 with its convex surface facing the object side, a biconcave lens L5, and a cemented lens in which a biconvex lens L6 and a biconcave lens L7 are joined together, which are sequentially arranged, in that order, from the object side. As a unit, the second lens group G2 has a negative refractive power. It should be noted that the surface S8 of the biconcave lens L5 is aspherical on the object side.

The third lens group G3 is composed a biconvex lens L8, a biconvex lens L9, and a biconcave lens L10, which are sequentially arranged, in that order, from the object side. As a unit, the third lens group G3 has a positive refractive power. The light amount controlling mechanism IR is provided adjacent to the third lens group G3 on the object side as is the case with the first example.

The fourth lens group G4 has the same structure as that of the first example. The fifth lens group G5 is composed of a biconvex lens L13 and a biconcave lens L14, which are sequentially arranged in that order from the object side. As a whole, the fifth lens group G5 has a positive refractive power.

Table 5 shows the focal length, F number, and half viewing angle of the zoom lens according to the second example for wide angle, intermediate and telephoto.

TABLE 5

| FOCAL LENGTH | f | Fno | ω |
|---|---|---|---|
| SHORT | 4.73 | 2.49 | 38.69 |
| INTERMEDIATE | 18.30 | 3.11 | 11.04 |
| LONG | 71.00 | 5.05 | 2.87 |

Table 6 shows numerical data of a zoom lens according to the second example.

TABLE 6

| | SURFACE | | RADIUS OF CURVATURE | SURFACE SPACE T | | REFRACTIVE INDEX Nd | | ABBE NUMBER vd | |
|---|---|---|---|---|---|---|---|---|---|
| L1 | S1 | R1 | 74.870 | T1 | 1.700 | ndL1 | 1.8467 | vdL1 | 23.8 |
| L2 | S2 | R2 | 48.640 | T2 | 8.130 | ndL2 | 1.4875 | vdL2 | 70.4 |
| | S3 | R3 | −271.800 | T3 | 0.200 | — | | — | |
| L3 | S4 | R4 | 33.950 | T4 | 4.580 | ndL3 | 1.4970 | vdL3 | 81.6 |
| | S5 | R5 | 101.000 | T5 | VARIABLE | — | | — | |
| L4 | S6 | R6 | 66.390 | T6 | 1.400 | ndL4 | 1.7550 | vdL4 | 52.3 |
| | S7 | R7 | 7.495 | T7 | 4.870 | — | | — | |
| L5 | S8 | R8 | −21.823 | T8 | 1.500 | ndL5 | 1.7433 | vdL5 | 49.3 |
| | S9 | R9 | 22.542 | T9 | 0.150 | — | | — | |
| L6 | S10 | R10 | 16.040 | T10 | 3.700 | ndL6 | 1.8467 | vdL6 | 23.8 |
| L7 | S11 | R11 | −24.935 | T11 | 0.800 | ndL7 | 1.8350 | vdL7 | 43.0 |
| | S12 | R12 | 77.440 | T12 | VARIABLE | — | | — | |
| IR | — | R13 | — | T13 | 0.500 | — | | — | |
| L8 | S13 | R14 | 16.848 | T14 | 1.800 | ndL8 | 1.8155 | vdL8 | 44.5 |
| | S14 | R15 | −61.470 | T15 | 0.100 | — | | — | |
| L9 | S15 | R16 | 12.163 | T16 | 2.800 | ndL9 | 1.4970 | vdL9 | 61.6 |
| | S16 | R17 | −31.700 | T17 | 0.120 | — | | — | |
| L10 | S17 | R18 | −22.524 | T18 | 2.000 | ndL10 | 1.7174 | vdL10 | 29.5 |
| | S18 | R19 | 9.948 | T19 | VARIABLE | — | | — | |
| L11 | S19 | R20 | 14.198 | T20 | 0.700 | ndL11 | 1.8042 | vdL11 | 46.5 |
| L12 | S20 | R21 | 8.782 | T21 | 4.000 | ndL12 | 1.4875 | vdL12 | 70.4 |
| | S21 | R22 | −29.390 | T22 | VARIABLE | — | | — | |
| L13 | S22 | R23 | 13.655 | T23 | 3.000 | ndL13 | 1.7170 | vdL13 | 48.0 |
| | S23 | R24 | −48.420 | T24 | 0.500 | — | | — | |
| L14 | S24 | R25 | −35.420 | T25 | 1.200 | ndL14 | 1.8061 | vdL14 | 33.3 |
| | S25 | R26 | 53.390 | T26 | VARIABLE | — | | — | |
| L15 | S26 | R27 | INF | T27 | 1.500 | ndL15 | 1.5168 | vdL15 | 64.2 |
| | S27 | R28 | INF | | — | — | | — | |

Table 7 shows the values of surface intervals T5, T12, T19, T22, and T26, which according to the second example can be varied by zooming at the wide angle, intermediate, and telephoto.

TABLE 7

| | FOCAL LENGTH | | |
|---|---|---|---|
| | 4.73 | 18.30 | 71.00 |
| S5 | 1.000 | 24.599 | 36.000 |
| S12 | 27.000 | 10.061 | 2.000 |
| S18 | 6.000 | 2.500 | 2.000 |
| S21 | 3.600 | 11.230 | 36.000 |
| S25 | 2.241 | 4.764 | 4.000 |

Table 8 shows parameters of the Conditional Expressions (1) to (9) according to the second example.

TABLE 8

| (1) | T34w/T34t | 3.00 |
|---|---|---|
| (2) | f34w/fw | 3.79 |
| (3) | f34t/ft | 0.23 |
| (4) | f3/fw | 5.10 |
| (5) | f4/ft | 0.38 |
| (6) | f1/fw | 13.70 |
| (7) | |f2/ft| | 0.11 |
| (8) | |Ra/fw| | 6.20 |
| (9) | f5/ft | 0.42 |

The surface S8 of the biconcave lens L5 constituting the second lens group G2 is aspherical on the object side. Table 9 shows aspheric surface coefficients on the surface S8.

TABLE 9

| SURCFACE NUMBER | k | A | B | C | D |
|---|---|---|---|---|---|
| S8 | 0.00000E+00 | 1.4680E−06 | 8.0185E−07 | −1.7286E−08 | 0.0000E+00 |

The "E" in Table 9 and below denotes an exponential representation with 10 as a base.

Figure 7:
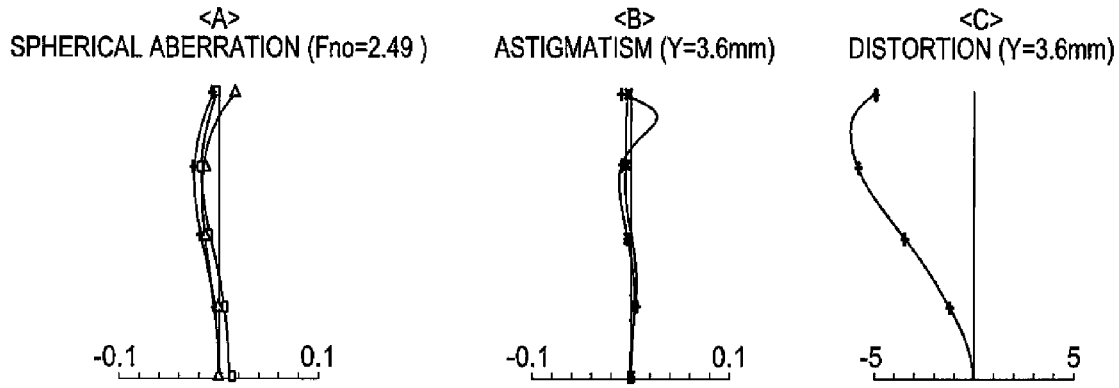
FIG. 7 shows various aberrations of the zoom lens according to the second example at a wide angle end.
Figure 7:
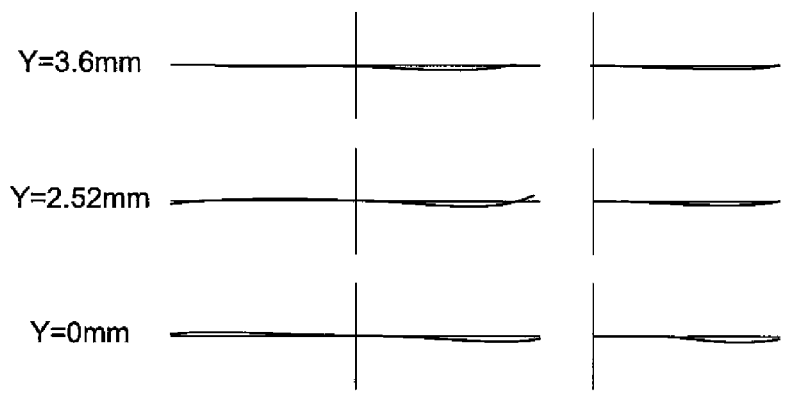
Figure 7:
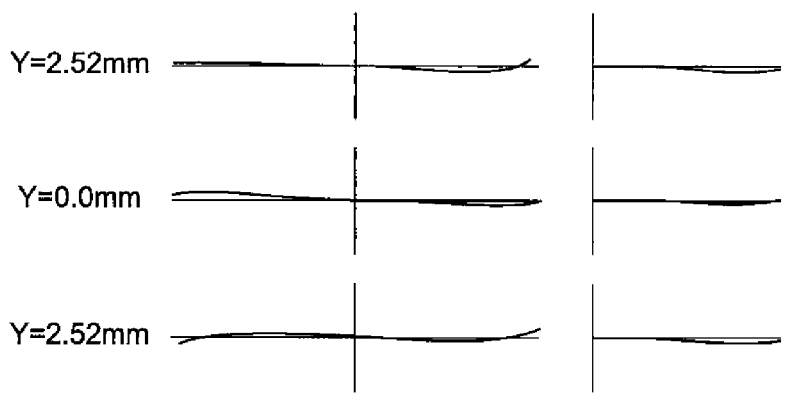
Figure 8:
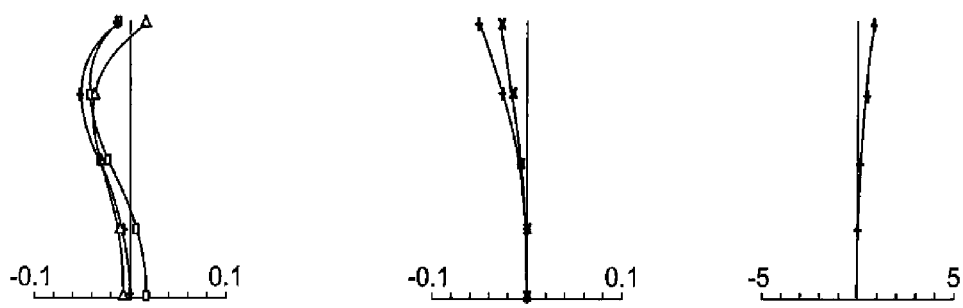
FIG. 8 shows various aberrations of the zoom lens according to the second example at an intermediate-focal length end.
Figure 8:
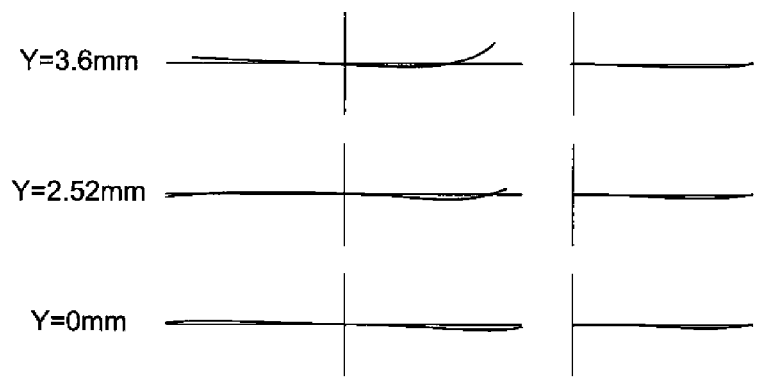
Figure 8:
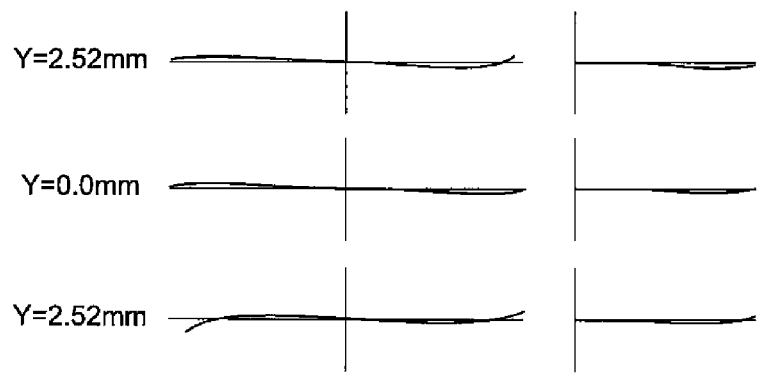
Figure 9:
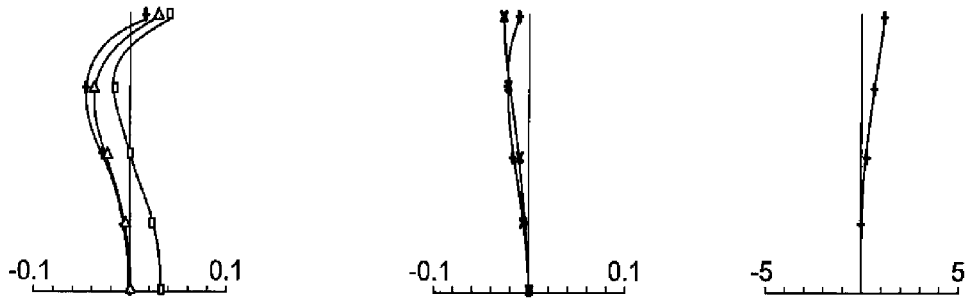
FIG. 9 shows various aberrations of the zoom lens according to the second example at a telephoto end.
Figure 9:
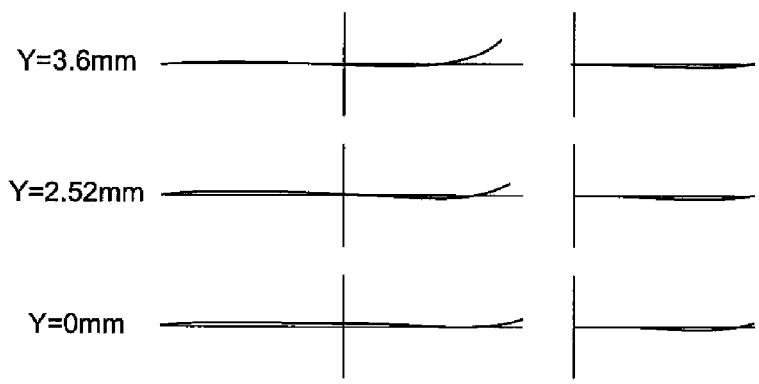
Figure 9:
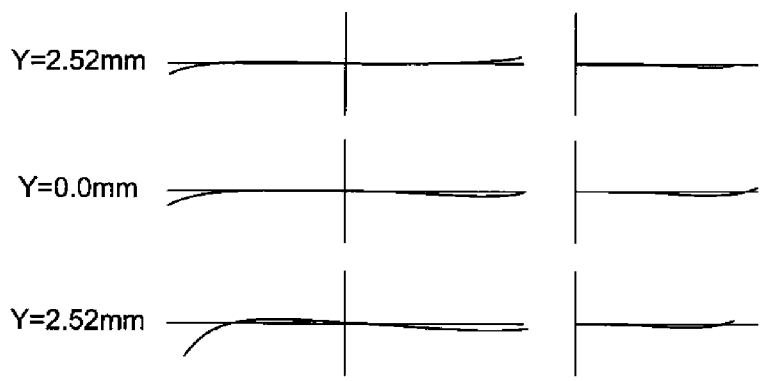

FIGS. 7 to 9 show various aberrations of the zoom lens 10 according to the second example at wide angle, intermediate, and telephoto.

THIRD EXAMPLE

Figure 10:
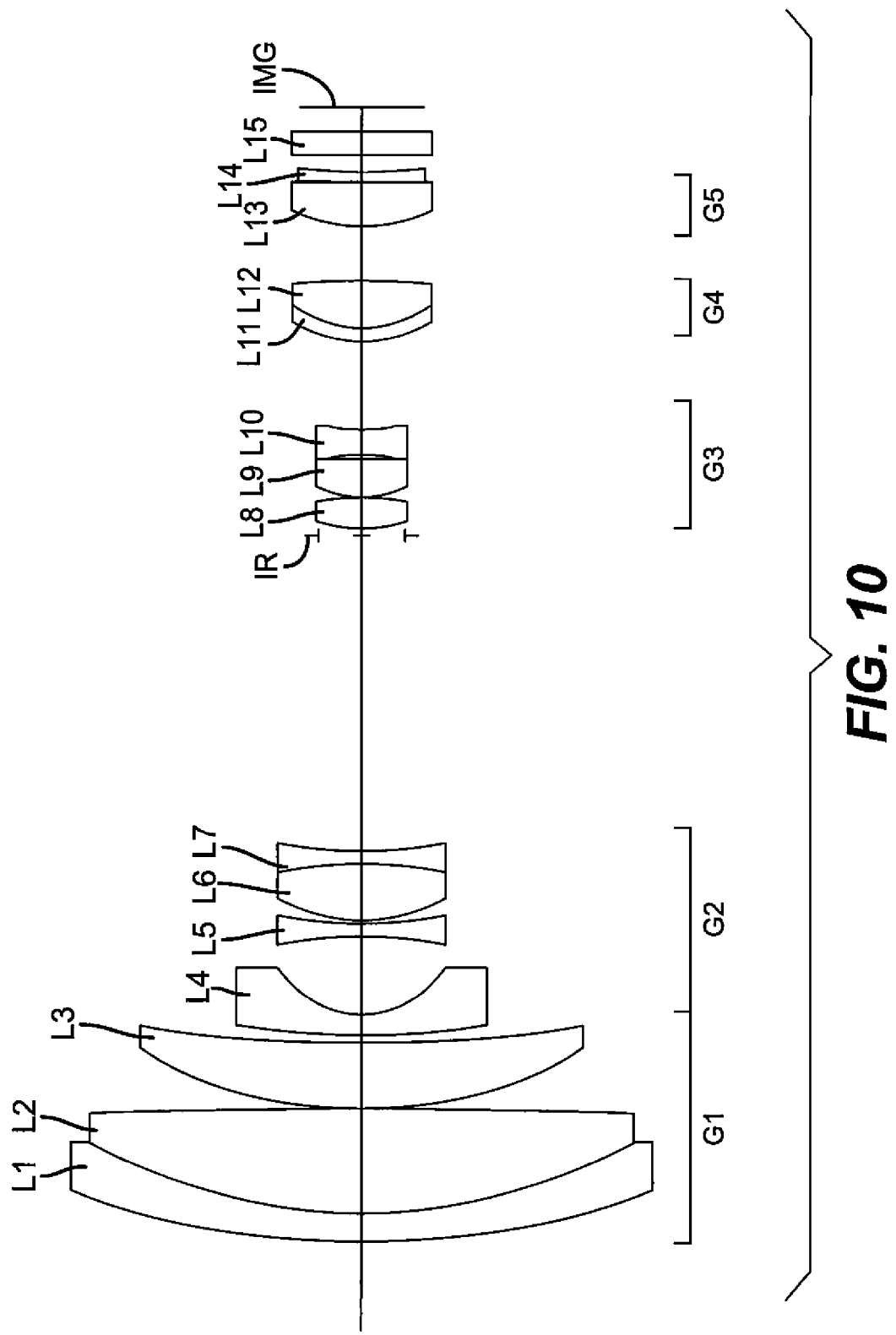
FIG. 10 shows a cross section along an optical axis of a zoom lens according to a third example of the present invention at a wide angle end.

Next, a third example of the present invention will be described. As shown in FIG. 10, in the zoom lens 10 according to the third example, the first lens group G1 has the same structure as that of the first and the second example and the second lens group G2 is also the same in structure as that in the second example.

Table 10 shows the focal length, F number and half viewing angle of the zoom lens according to the third example at the wide angle, intermediate and telephoto ends.

TABLE 10

| FOCAL LENGTH | f | Fno | ω |
|---|---|---|---|
| SHORT | 4.73 | 2.78 | 38.50 |
| INTERMEDIATE | 16.33 | 3.53 | 12.29 |
| LONG | 49.93 | 4.91 | 4.08 |

Table 11 shows numerical data or a zoom lens according to the third example.

TABLE 11

| | SURFACE | | RADIUS OF CURVATURE | | SURFACE SPACE T | | REFRACTIVE INDEX Nd | | ABBE NUMBER vd |
|---|---|---|---|---|---|---|---|---|---|
| L1 | S1 | R1 | 77.650 | T1 | 1.500 | ndL1 | 1.8467 | vdL1 | 23.8 |
| L2 | S2 | R2 | 49.780 | T2 | 8.000 | ndL2 | 1.4875 | vdL2 | 70.4 |
| | S3 | R3 | −251.600 | T3 | 0.200 | — | | — | |
| L3 | S4 | R4 | 30.940 | T4 | 4.800 | ndL3 | 1.4970 | vdL3 | 81.6 |
| | S5 | R5 | 106.100 | T5 | VARIABLE | — | | — | |
| L4 | S6 | R6 | 105.746 | T6 | 1.300 | ndL4 | 1.7550 | vdL4 | 52.3 |
| | S7 | R7 | 7.940 | T7 | 5.925 | — | | — | |
| L5 | S8 | R8 | −26.410 | T8 | 1.500 | ndL5 | 1.7433 | vdL5 | 49.3 |
| | S9 | R9 | 19.112 | T9 | 0.200 | — | | — | |
| L6 | S10 | R10 | 16.268 | T10 | 3.600 | ndL6 | 1.8467 | vdL6 | 23.8 |
| L7 | S11 | R11 | −18.080 | T11 | 0.800 | ndL7 | 1.8350 | vdL7 | 43.0 |
| | S12 | R12 | 61.312 | T12 | VARIABLE | — | | — | |
| IR | — | R13 | — | T13 | 0.500 | — | | — | |
| L8 | S13 | R14 | 15.710 | T14 | 2.200 | ndL8 | 1.7550 | vdL8 | 52.3 |
| | S14 | R15 | −31.780 | T15 | 0.100 | — | | — | |
| L9 | S15 | R16 | 11.208 | T16 | 2.800 | ndL9 | 1.4970 | vdL9 | 81.6 |
| | S16 | R17 | 253.900 | T17 | 0.398 | | | | |
| L10 | S17 | R18 | −24.727 | T18 | 1.800 | ndL10 | 1.7408 | vdL10 | 27.8 |
| | S18 | R19 | 9.898 | T19 | VARIABLE | — | | — | |
| L11 | S19 | R20 | 14.732 | T20 | 0.700 | ndL11 | 1.8042 | vdL11 | 46.5 |
| L12 | S20 | R21 | 8.831 | T21 | 3.800 | ndL12 | 1.4875 | vdL12 | 70.4 |
| | S21 | R22 | −27.570 | T22 | VARIABLE | — | | — | |
| L13 | S22 | R23 | 11.557 | T23 | 3.200 | ndL13 | 1.8042 | vdL13 | 46.5 |
| L14 | S23 | R24 | 44.390 | T24 | 1.000 | ndL14 | 1.8052 | vdL14 | 25.5 |
| | S24 | R25 | 27.595 | T25 | VARIABLE | — | | — | |
| L15 | S25 | R26 | INF | T26 | 1.500 | ndL15 | 1.5168 | vdL15 | 64.2 |
| | S26 | R27 | INF | | — | | | | |

The third lens group G3 is composed of a biconvex lens L8, a positive meniscus lens L9 with its convex surface facing the object side, and a biconcave lens L10, which are sequentially arranged, in that order, from the object side. As a unit, the third lens group G3 has a positive refractive power. The light amount controlling mechanism IR is provided adjacent to the third lens group G3 on the object side.

The fourth lens group G4 has the same structure as that of the first and the second example. The fifth lens group G5 is constituted by a cemented lens in which a positive meniscus lens L13 with its convex surface facing the object side and a negative meniscus lens L14 are sequentially arranged in that order from the object side and joined together. As a unit, the fifth lens group G5 has a positive refractive power.

Table 12 shows values of surface intervals T5, T12, T19, T22, and T25 which according to the third example can be varied by zooming at wide angle, intermediate, and telephoto.

TABLE 12

| | FOCAL LENGTH | | |
|---|---|---|---|
| | 4.73 | 16.33 | 49.93 |
| S5 | 1.000 | 20.935 | 28.935 |
| S12 | 25.170 | 10.648 | 3.667 |
| S18 | 7.150 | 3.000 | 2.000 |

TABLE 12-continued

| | FOCAL LENGTH | | |
|---|---|---|---|
| | 4.73 | 16.33 | 49.93 |
| S21 | 4.000 | 13.434 | 35.000 |
| S25 | 1.460 | 2.710 | 2.548 |

Table 13 shows the parameters of the Conditional Expressions (1) to (9) in the third example.

TABLE 13

| (1) | T34w/T34t | 3.58 |
|---|---|---|
| (2) | f34w/fw | 3.89 |
| (3) | f34t/ft | 0.33 |
| (4) | f3/fw | 4.78 |
| (5) | f4/ft | 0.54 |
| (6) | f1/fw | 12.25 |
| (7) | |f2/ft| | 0.15 |
| (8) | |Ra/fw| | 5.83 |
| (9) | f5/ft | 0.47 |

The surface S8 of the biconcave lens L5 constituting the second lens group G2 is aspherical on the object side. Table 14 shows aspheric surface coefficients on the surface S8.

TABLE 14

| SURCFACE NUMBER | k | A | B | C | D |
|---|---|---|---|---|---|
| S8 | −4.34320E+00 | −4.1708E−06 | 4.1300E−07 | 8.6421E−09 | −2.6955E−10 |

Figure 11:
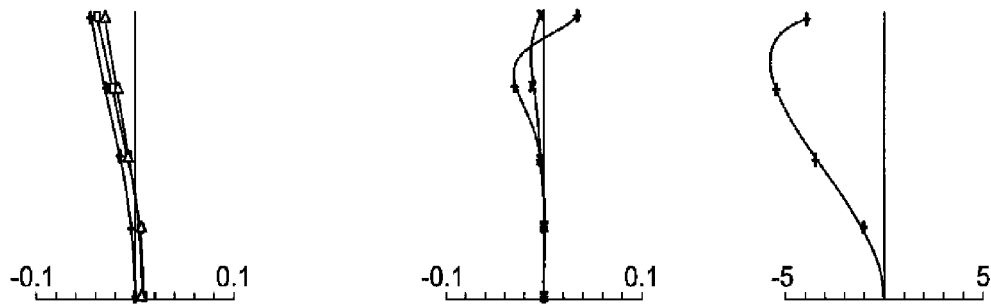
FIG. 11 shows various aberrations of the zoom lens according to the third example at a wide angle end.
Figure 11:
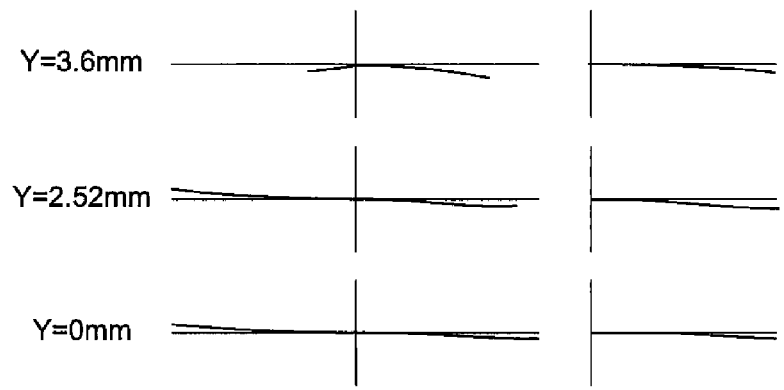
Figure 11:
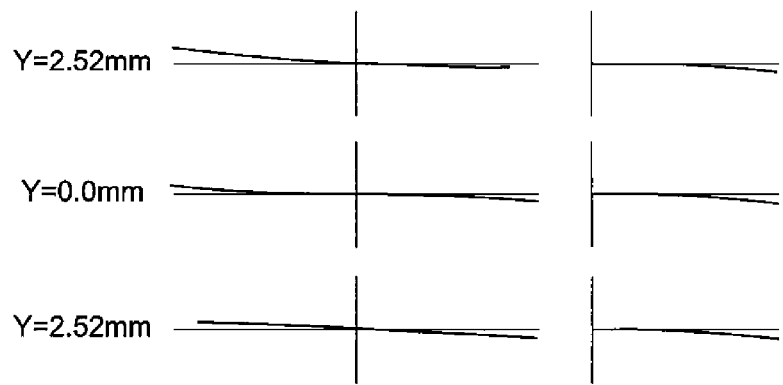
Figure 12:
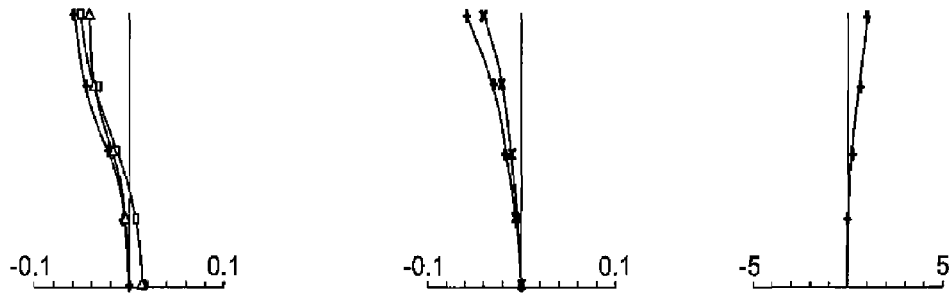
FIG. 12 shows various aberrations of the zoom lens according to the third example at an intermediate-focal length end.
Figure 12:
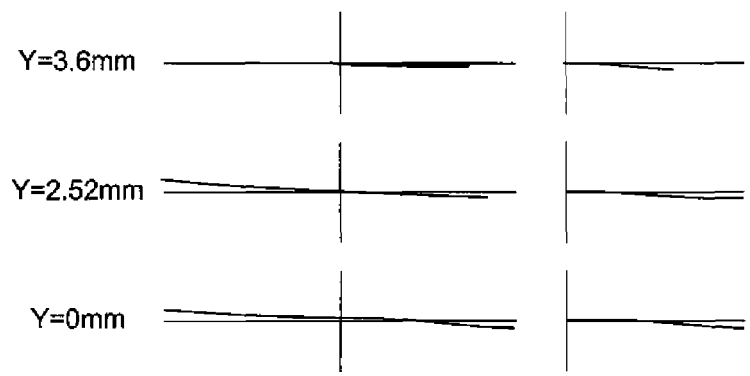
Figure 12:
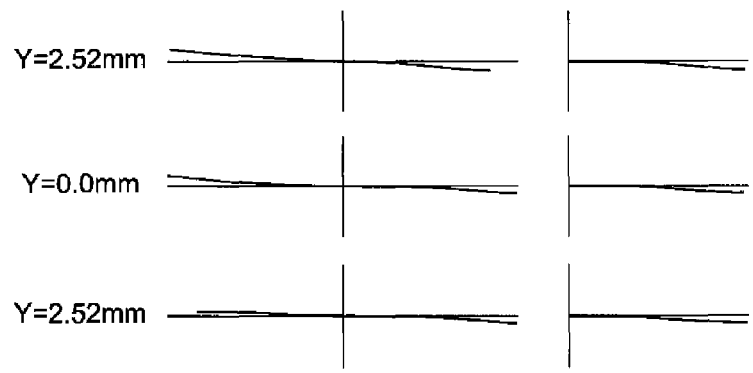
Figure 13:
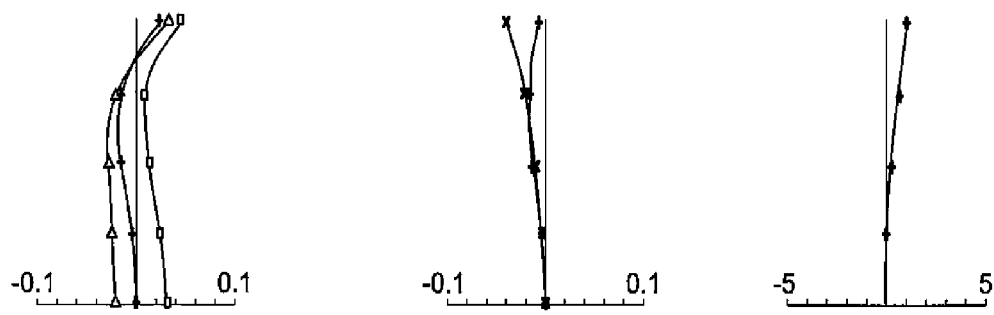
FIG. 13 shows various aberrations of the zoom lens according to the third example at a telephoto end.
Figure 13:
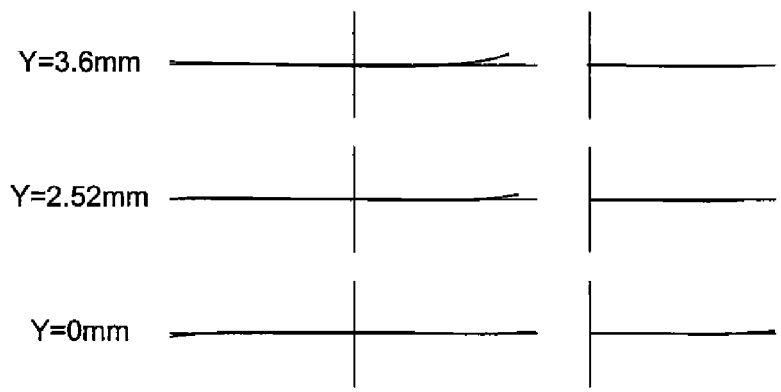
Figure 13:
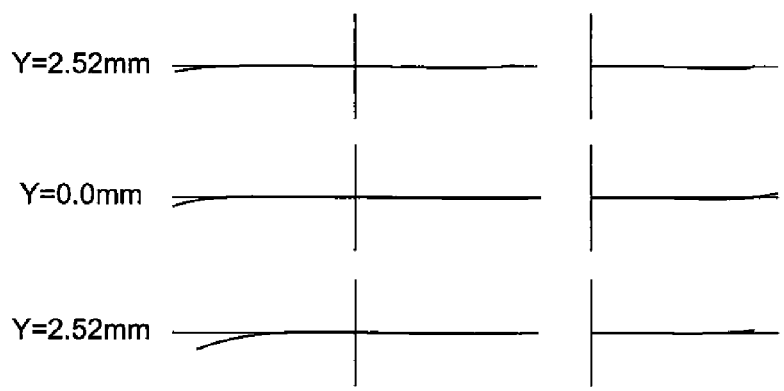

FIGS. 11 to 13 show various aberrations of the zoom lens 10 according to the third example at the wide angle, intermediate and telephoto ends.

FOURTH EXAMPLE

Figure 14:
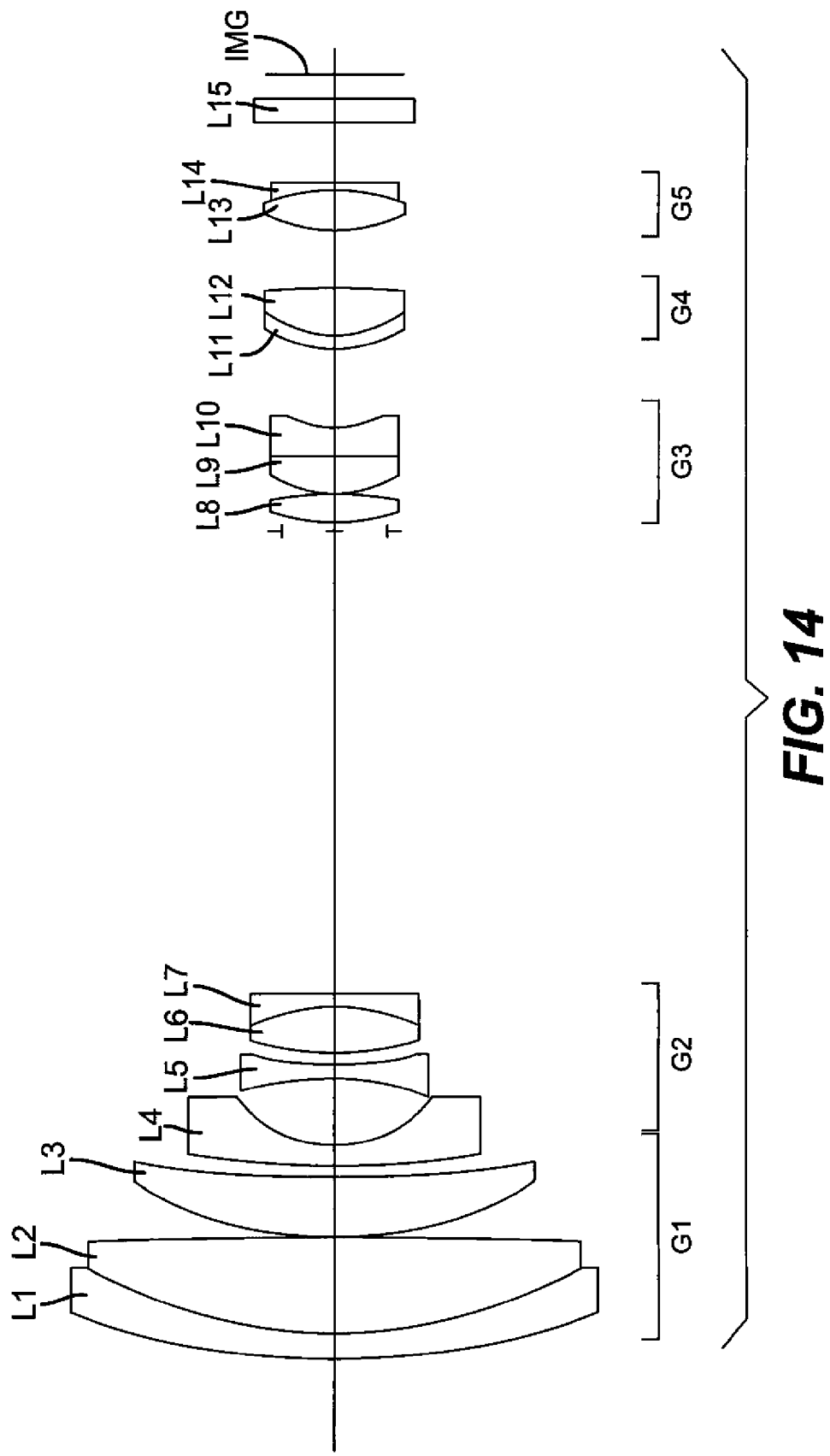
FIG. 14 shows a cross section along an optical axis of a zoom lens according to a fourth example of the present invention at a wide angle end.

Next, a fourth example of the present invention will be described. As shown in FIG. 14, in the zoom lens 10 according to the fourth example, the first lens group G1 has the same structure as that of the first to the third example, and the second lens group G2 also has the same structure as that of the second and third examples.

The third lens group G3 is composed of a biconvex lens L8 and a cemented lens in which a positive meniscus lens L9 with its convex surface facing the object side and a negative meniscus lens L10 are joined together, and in which these lenses are sequentially arranged in that order from the object side. As a unit, the third lens group G3 has a positive refractive power. The surface S13 of the biconvex lens L8 is aspherical on the side of an object. In addition, the light amount controlling mechanism IR is provided adjacent to the third lens group G3 on the object side.

The fourth lens group G4 has the same structure as that of the first to the third example. The fifth lens group G5 is constituted by a cemented lens in which a biconvex lens L13 and a biconcave lens L14 are sequentially arranged, in that order, from the object side and joined together. As a unit, the fifth lens group G5 has a positive refractive power.

Table 15 shows the focal length, F number and half viewing angle of the zoom lens according to the fourth example at wide angle, intermediate, and telephoto.

TABLE 15

| FOCAL LENGTH | f | Fno | ω |
|---|---|---|---|
| SHORT | 4.74 | 2.72 | 38.58 |
| INTERMEDIATE | 19.42 | 3.84 | 10.32 |
| LONG | 80.00 | 5.80 | 2.53 |

Table 16 shows numerical data of a zoom lens according to the fourth example.

TABLE 16

| | SURFACE | | RADIUS OF CURVATURE | | SURFACE SPACE T | REFRACTIVE INDEX Nd | ABBE NUMBER vd | |
|---|---|---|---|---|---|---|---|---|
| L1 | S1 | R1 | 67.090 | T1 | 1.560 | ndL1 | 1.8467 | vdL1 23.8 |
| L2 | S2 | R2 | 42.920 | T2 | 6.800 | ndL2 | 1.4970 | vdL2 81.6 |
| | S3 | R3 | −253.800 | T3 | 0.155 | — | | — |
| L3 | S4 | R4 | 31.469 | T4 | 3.300 | ndL3 | 1.4970 | vdL3 81.6 |
| | S5 | R5 | 90.020 | T5 | VARIABLE | — | | — |
| L4 | S6 | R6 | 57.000 | T6 | 1.200 | ndL4 | 1.7550 | vdL4 52.3 |
| | S7 | R7 | 8.090 | T7 | 4.670 | — | | — |
| L5 | S8 | R8 | −22.260 | T8 | 1.000 | ndL5 | 1.7433 | vdL5 49.3 |
| | S9 | R9 | 21.780 | T9 | 0.840 | — | | — |
| L6 | S10 | R10 | 19.857 | T10 | 3.200 | ndL6 | 1.8467 | vdL6 23.8 |
| L7 | S11 | R11 | −13.938 | T11 | 0.700 | ndL7 | 1.8350 | vdL7 43.0 |
| | S12 | R12 | −526.000 | T12 | VARIABLE | — | | — |
| IR | | R13 | — | T13 | 0.400 | — | | — |
| L8 | S13 | R14 | 17.397 | T14 | 1.800 | ndL8 | 1.7550 | vdL8 52.3 |
| | S14 | R15 | −41.070 | T15 | 0.160 | — | | — |
| L9 | S15 | R16 | 8.140 | T16 | 2.300 | ndL9 | 1.4970 | vdL9 81.6 |
| L10 | S16 | R17 | 41.990 | T17 | 2.000 | ndL10 | 1.7408 | vdL10 27.8 |
| | S17 | R18 | 7.716 | T18 | VARIABLE | — | | — |

TABLE 16-continued

| SURFACE | | RADIUS OF CURVATURE | | SURFACE SPACE T | | REFRACTIVE INDEX Nd | | ABBE NUMBER vd | |
|---|---|---|---|---|---|---|---|---|---|
| L11 | S18 | R19 | 18.583 | T19 | 0.630 | ndL11 | 1.8042 | vdL11 | 46.5 |
| L12 | S19 | R20 | 10.881 | T20 | 3.200 | ndL12 | 1.4875 | vdL12 | 70.4 |
|  | S20 | R21 | −37.388 | T21 | VARIABLE | — | — | — | — |
| L13 | S21 | R22 | 16.297 | T22 | 2.400 | ndL13 | 1.8042 | vdL13 | 46.5 |
| L14 | S22 | R23 | −14.920 | T23 | 0.630 | ndL14 | 1.8052 | vdL14 | 25.5 |
|  | S23 | R24 | 133.300 | T24 | VARIABLE | — | — | — | — |
| L15 | S24 | R25 | INF | T25 | 1.500 | ndL15 | 1.5168 | vdL15 | 64.2 |
|  | S25 | R26 | INF | — | — | — | — | — | — |

Table 17 shows values of surface intervals T5, T12, T18, T21 and T24 which, according to the fourth example, can be varied by zooming at wide angle, intermediate, and telephoto.

TABLE 17

| | FOCAL LENGTH | | |
|---|---|---|---|
| | 4.73 | 16.33 | 49.93 |
| S5 | 1.000 | 20.935 | 28.935 |
| S12 | 25.170 | 10.648 | 3.667 |
| S18 | 7.150 | 3.000 | 2.000 |
| S21 | 4.000 | 13.434 | 35.000 |
| S25 | 1.460 | 2.710 | 2.548 |

Table 18 shows the parameters of the Conditional Expressions (1) to (9) in the fourth example.

TABLE 18

| (1) | T34w/T34t | 3.87 |
|---|---|---|
| (2) | f34w/fw | 3.94 |
| (3) | f34t/ft | 0.20 |
| (4) | f3/fw | 4.44 |
| (5) | f4/ft | 0.43 |
| (6) | f1/fw | 13.33 |
| (7) | |f2/ft| | 0.11 |
| (8) | |Ra/fw| | 7.89 |
| (9) | f5/ft | 0.44 |

The surface S8 of the biconcave lens L5 constituting the second lens group G2 and the surface S13 of the biconvex lens L8 constituting the third lens group G3 are aspherical on the object side. Table 19 shows aspheric surface coefficients on the surfaces S8 and S13.

TABLE 19

| SURFACE NUMBER | k | A | B | C | D |
|---|---|---|---|---|---|
| S8 | −1.20200E+00 | −3.4361E−07 | 7.4765E−07 | −2.0054E−08 | 0.0000E+00 |
| S13 | −2.30800E+00 | 0.0000E+00 | 0.0000E+00 | 0.0000E+00 | 0.0000E+00 |

Figure 15:
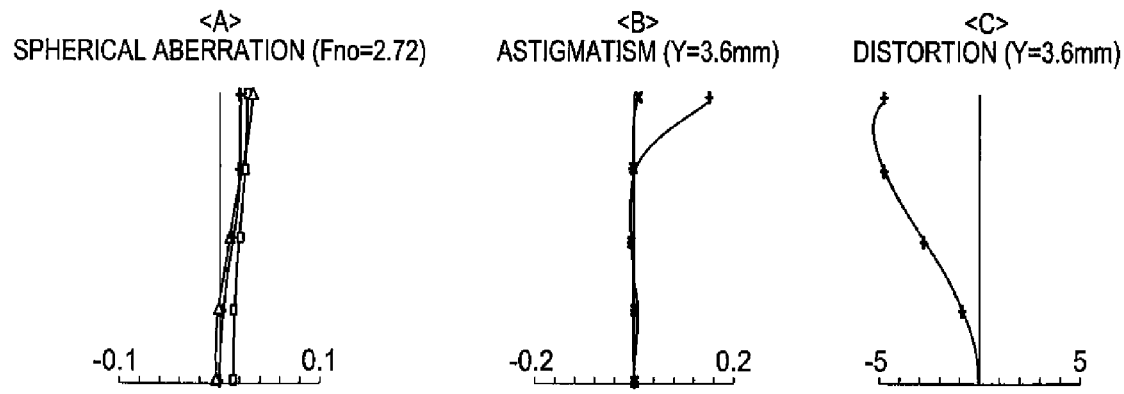
FIG. 15 shows various aberrations of the zoom lens according to the fourth example at a wide angle end.
Figure 15:
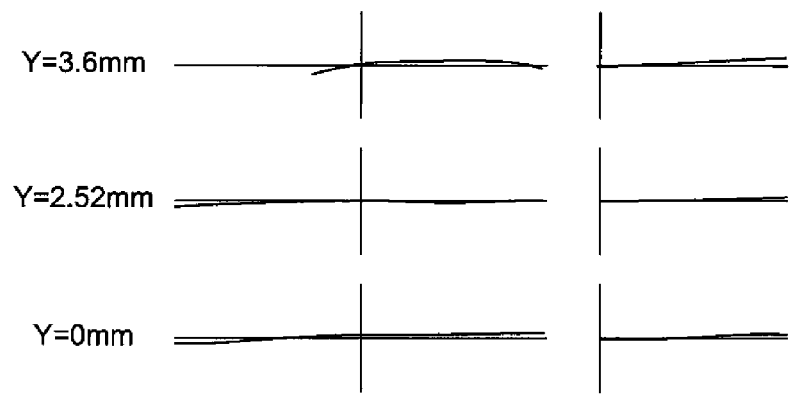
Figure 15:
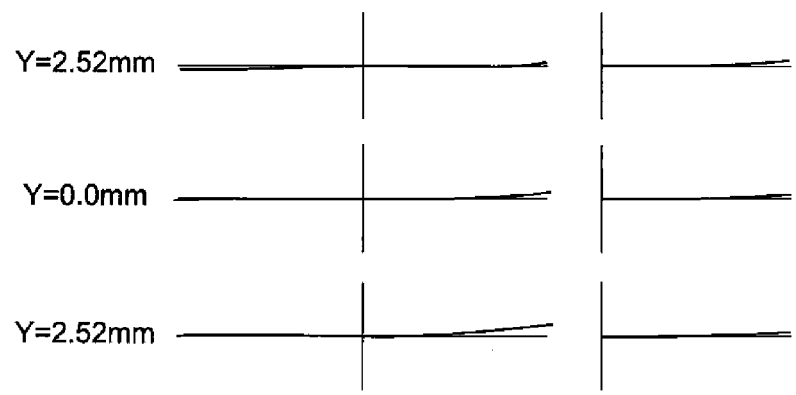
Figure 16:
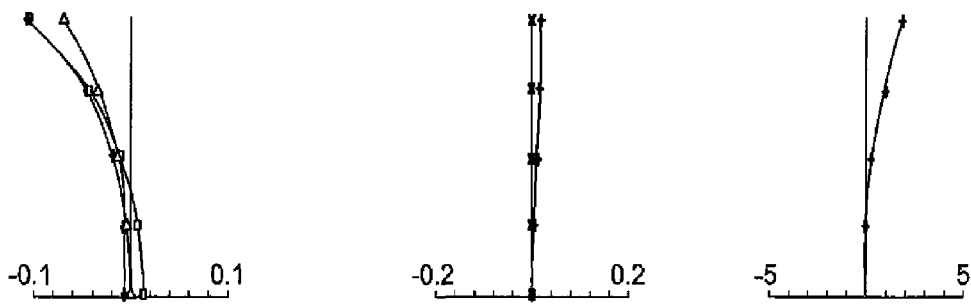
FIG. 16 shows various aberrations of the zoom lens according to the fourth example at an intermediate-focal length end.
Figure 16:
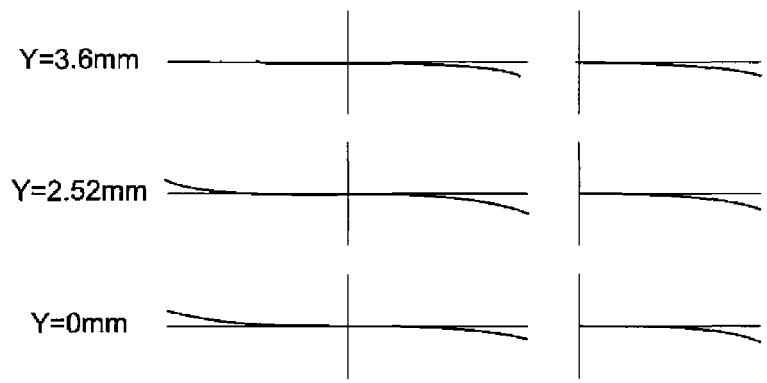
Figure 16:
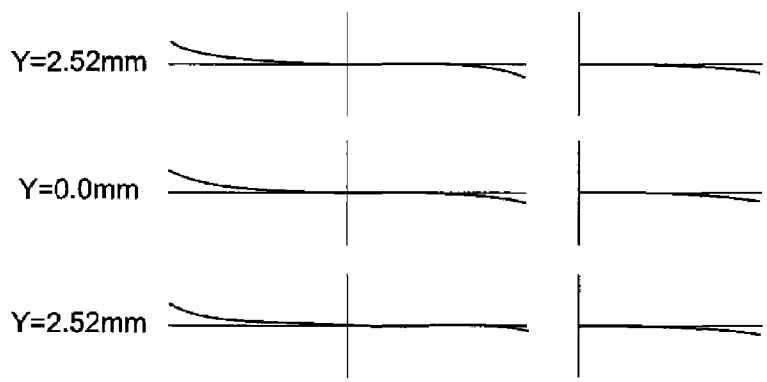
Figure 17:
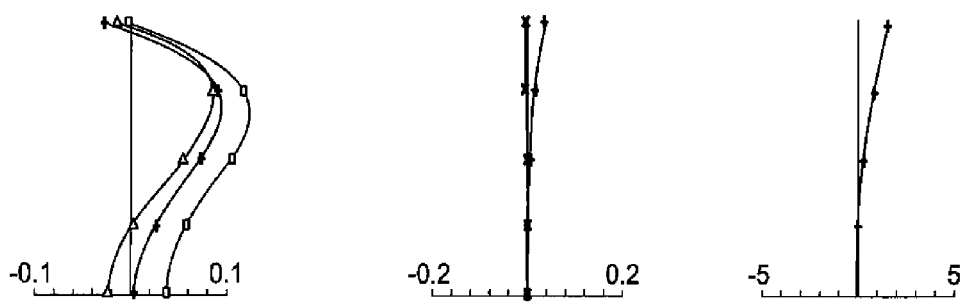
FIG. 17 shows various aberrations of the zoom lens according to the fourth example at a telephoto end.
Figure 17:
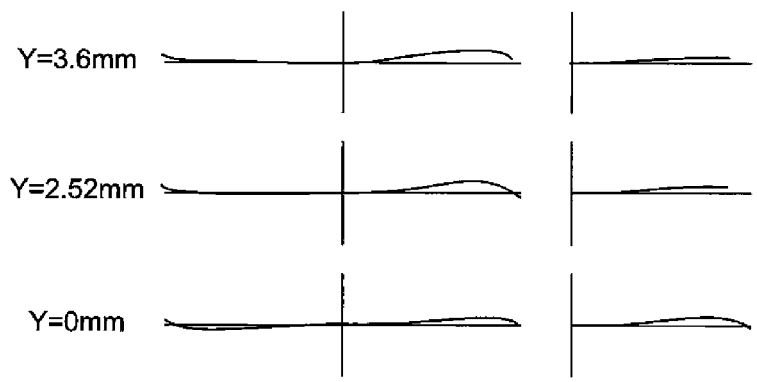
Figure 17:
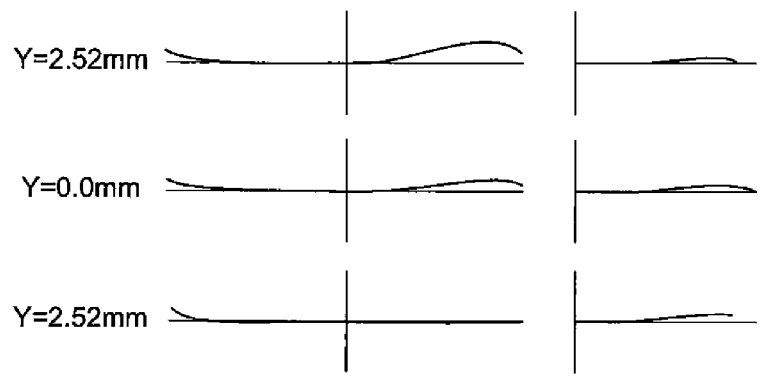

FIGS. 15 to 17 show various aberrations of the zoom lens 10 related to the fourth example at wide angle, intermediate, and telephoto.

Figure 18:
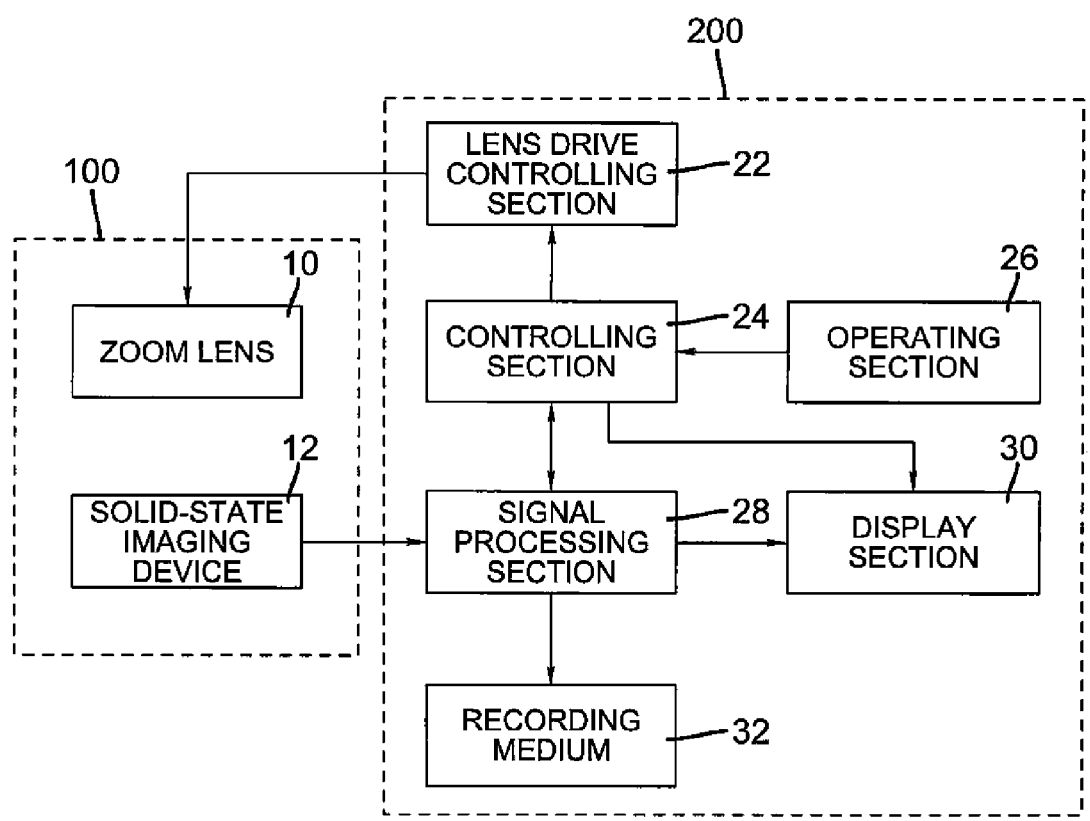
FIG. 18 shows one example of a digital camera equipped with a zoom lens according to the present invention.

Next, an example imaging apparatus equipped with the zoom lens 10 will be described. FIG. 18 shows an example digital camera equipped with the zoom lens 10. The digital camera comprises a lens block 100 for capturing an object image and a main unit 200 for performing various processes on image signals and various control functions related to capturing an image. The lens block 100 includes the zoom lens 10 composed of five lens groups and a solid-state imaging device 12 for converting an object image introduced by the zoom lens 10 to an electric signal. The solid-state imaging device 12 outputs the object image converted to the electric signal to the main unit 200 as video data.

A controlling section 24 in the main unit 200 executes various processes based on user instructions input through an operating section 26. A signal processing section 28 subjects the image data output from the solid-state imaging device 12 to various signal processings such as A/D conversion and noise reduction. The signal-processed image data are output to a display section 30 or a recording medium 32. The recording medium 32 may be a data recording medium such as a memory card and the like. Captured image data is recorded in this recording medium. A display section 30 is a display device such as an LCD or the like on which users may view captured images. A lens drive controlling section 22 outputs a driving signal to a lens moving mechanism equipped with the zoom lens when focusing or zooming is required and to instruct the move of the lens groups. A motor for the lens moving mechanism equipped with the zoom lens is driven in response to an instruction to move the lens groups.

PARTS LIST 10 zoom lens
12 imaging device
22 controlling section
24 controlling section
26 operating section
28 signal processing section
30 display section
32 recording medium
100 lens block
200 main unit
G1 first lens group
G2 second lens group
G3 third lens group
G4 fourth lens group
G5 fifth lens group L1 negative meniscus lens
L2 biconvex lens
L3 positive meniscus lens
L4 negative meniscus lens
L5 biconcave lens
L6 biconvex lens
L7 biconcave lens
L8 biconvex lens
L9 biconvex lens
L10 biconcave lens
L11 negative meniscus lens
L12 biconvex lens
L13 biconcave lens
L14 negative meniscus lens
L15 optical equivalent member

The invention claimed is:

1. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power,
   wherein at least four lens groups including the first lens group, the second lens group, the third lens group, and the fourth lens group independently move along an optical axis to implement zooming,
      at least part of a lens group of the fourth lens group moves along a direction perpendicular to the optical axis to displace an image; and
   the zoom lens has a zooming range in which a space between the third lens group and the fourth lens group is gradually reduced from a wide angle end to a telephoto end.

2. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power,
   wherein at least four lens groups including the first lens group, the second lens group, the third lens group, and the fourth lens group independently move along an optical axis to implement zooming,
      at least part of a lens group of the fourth lens group moves along a direction perpendicular to the optical axis to displace an image; and
   wherein, when a surface spaces between the third lens group and the fourth lens group on the optical axis at the wide angle end and the telephoto end are taken T34$w$ and T34$t$, respectively, the zoom lens satisfies the following condition:

$2.0 < T34w/T34t < 7.0$.

3. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power,
   wherein at least four lens groups including the first lens group, the second lens group, the third lens group, and the fourth lens group independently move along an optical axis to implement zooming,
      at least part of a lens group of the fourth lens group moves along a direction perpendicular to the optical axis to displace an image; and
   wherein, when the composite focal lengths of the third lens group and the fourth lens group at the wide angle end and the telephoto end are f34$w$ and f34$t$, respectively; the focal length of the third lens group is f3; the focal length of the fourth lens group is f4; and the focal length of the overall system of the zoom lens at the wide angle end and the telephoto end are fw and ft, respectively, the zoom lens satisfies the following conditions:

$2.7 < f34w/fw < 4.0$ $0.15 < f34t/ft < 0.36$ $3.3 < f3/fw < 5.5$ $0.2 < f4/ft < 0.6$.

4. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power,
   wherein at least four lens groups including the first lens group, the second lens group, the third lens group, and the fourth lens group independently move along an optical axis to implement zooming,
      at least part of a lens group of the fourth lens group moves along a direction perpendicular to the optical axis to displace an image; and
   wherein, when the focal length of the first lens group is f1, the focal length of the second lens group is f2, and the focal lengths of the overall system at the wide angle end and the telephoto end are fw and ft, respectively, the zoom lens satisfies the following conditions:

$6.7 < f1/fw < 14.0$ $0.08 < |f2|/ft| 0.16$.

5. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power,
   wherein at least four lens groups including the first lens group, the second lens group, the third lens group, and the fourth lens group independently move along an optical axis to implement zooming,
      at least part of a lens group of the fourth lens group moves along a direction perpendicular to the optical axis to displace an image; and
   wherein, when the lens face of the fourth lens group positioned nearest to the image plane has a convex shape facing the image plane, the radius of curvature of the lens face is Ra, and the focal length of the overall system is fw at the wide angle end, the zoom lens satisfies the following condition:

$|Ra/fw| > 5.5$.

6. A zoom lens comprising, as arranged sequentially from an object side:
   a first lens group having a positive refractive power;
   a second lens group having a negative refractive power;
   a third lens group having a positive refractive power;
   a fourth lens group having a positive refractive power; and
   a fifth lens group having a positive refractive power, wherein at least four lens group, including the first lens group, the second lens group, the third lens group, and the fourth lens group independently move along an optical axis to implement zooming, at least part of a lens group of the fourth lens group moves along a direction perpendicular to the optical axis to displace an image; and the fourth lens group is constituted by a cemented lens in which a negative meniscus lens with its convex surface facing the object side and a biconvex lens having a positive refractive power are sequentially arranged in that order from the object side and joined together.

7. A zoom lens comprising, as arranged sequentially from an object side:

a first lens group having a positive refractive power;
a second lens group having a negative refractive power;
a third lens group having a positive refractive power;
a fourth lens group having a positive refractive power; and
a fifth lens group having a positive refractive power, wherein at least four lens groups including the first lens group, the second lens group, the third lens group, and the fourth lens group independently move along an optical axis to implement zooming, at least part of a lens group of the fourth lens group moves along a direction perpendicular to the optical axis to displace an image; and wherein, when the fifth lens group is moved to focus, the focal length of the fifth lens group is f5, and the focal length of the entire system at the telephoto end is ft, the zoom lens satisfies the following condition:

$$0.24 < f5/ft < 0.80.$$

8. A zoom lens comprising, as arranged sequentially from an object side;

a first lens group having a positive refractive power;
a second lens group having a negative refractive power;
a third lens group having a positive refractive power;
a fourth lens group having a positive refractive power; and
a fifth lens group having a positive refractive power, wherein at least four lens groups including the first lens group, the second lens group, the third lens group, and the fourth lens group independently move along an optical axis to implement zooming, at least part of a lens group of the fourth lens group moves along a direction perpendicular to the optical axis to displace an image; and each of the second lens group and the third lens group comprises at least one aspherical lens.

9. An imaging apparatus comprising the zoom lens according to claim 1.

* * * * *

UNITED STATES PATENT AND TRADEMARK OFFICE
CERTIFICATE OF CORRECTION

PATENT NO. : 7,443,602 B2  Page 1 of 1
APPLICATION NO. : 11/564311
DATED : October 28, 2008
INVENTOR(S) : Taro Kushida et al.

It is certified that error appears in the above-identified patent and that said Letters Patent is hereby corrected as shown below:

Col. 22 Claim 4, line 38    "$0.08 < |f2/ft|\ 0.16$" should be replaced with --$0.08 < |f2/ft| < 0.16$--.

Signed and Sealed this

Seventeenth Day of February, 2009

JOHN DOLL
*Acting Director of the United States Patent and Trademark Office*